US012002076B1

(12) United States Patent
Evenson et al.

(10) Patent No.: US 12,002,076 B1
(45) Date of Patent: Jun. 4, 2024

(54) METHOD, COMPUTER-READABLE MEDIA, AND SYSTEM FOR TRANSACTION DATA GENERATION WITH VARYING FIDELITY

(71) Applicant: Amazon Technologies, Inc., Seattle, WA (US)

(72) Inventors: Andrew Ross Evenson, Seattle, WA (US); Onkar Bhaskar Walavalkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 747 days.

(21) Appl. No.: 14/805,382

(22) Filed: Jul. 21, 2015

(51) Int. Cl.
*G06Q 30/06* (2023.01)
*G06Q 30/0601* (2023.01)

(52) U.S. Cl.
CPC .................. *G06Q 30/0601* (2013.01)

(58) Field of Classification Search
CPC ............................ G06Q 30/06; G06Q 30/0601
USPC ................................................. 705/26.1–27.2
See application file for complete search history.

(56) References Cited

U.S. PATENT DOCUMENTS

| 6,871,226 B1 * | 3/2005 | Ensley ..................... H04L 61/35 709/239 |
| 2014/0330741 A1 * | 11/2014 | Bialynicka-Birula ....... G06Q 10/0838 705/341 |
| 2015/0032486 A1 * | 1/2015 | Francois ................ G06Q 10/02 705/5 |

OTHER PUBLICATIONS

Vinh, Phan Van, and Hoon Oh. "An Optimized Approach for Time-Constrained and Reliable Bursty Data Acquisition in WMSNs." International Journal of Distributed Sensor Networks, Jun. 2015, doi: 10.1155/2015/826937.*
U.S. Appl. No. 14/751,077, filed Jun. 25, 2015, Onkar Bhaskar Walavalkar et al.
U.S. Appl. No. 14/752,795, filed Jun. 26, 2015, Amol Madhav Joshi et al.
U.S. Appl. No. 14/751,074, filed Jun. 25, 2015, Onkar Bhaskar Walavalkar et al.

* cited by examiner

*Primary Examiner* — Jeffrey A. Smith
*Assistant Examiner* — Jennifer V Lee
(74) *Attorney, Agent, or Firm* — Robert C. Kowert; Kowert, Hood, Munyon, Rankin & Goetzel, P.C.

(57) ABSTRACT

Techniques are described for generating transaction data for a transaction, the transaction data generated with varying fidelity levels based on various constraints. In response to a transaction request from a client, a contract engine may perform service call(s) that instruct network service(s) to generate transaction data. The service call(s) may include constraint(s) on the generation of the transaction data, such as a time limit or a requested fidelity. The network service(s) may generate the transaction data at a particular fidelity based on the time limit, requested fidelity, or other criteria such as current load on the network service(s). The transaction data may be communicated to the contract engine with a fidelity indicator. Lower fidelity transaction data may be sent to the client to enable a low latency user experience. The lower fidelity transaction data may subsequently be replaced with higher fidelity transaction data generated with higher latency.

20 Claims, 11 Drawing Sheets

METHOD, COMPUTER-READABLE MEDIA, AND SYSTEM FOR TRANSACTION DATA GENERATION WITH VARYING FIDELITY

BACKGROUND

A business or other organization may deploy software to provide various services related to online shopping, electronic commerce, digital media delivery, gaming, communications, web search, social networking, and so forth. Such services may be provided through one or more software systems executing on the computing devices, as in a distributed software deployment on the computing devices. In some cases, distributed software may include front-end software that provides an interface with end-users, and back-end software that processes data received from the front-end software and generates data to be presented through the front-end software. To improve the experience of end-users interacting with the interface, an organization may seek ways to reduce the latency of generating the data to be presented via the front-end software, expedite the delivery of the data to the front-end software, or increase the availability of the software generally.

Figure 1:
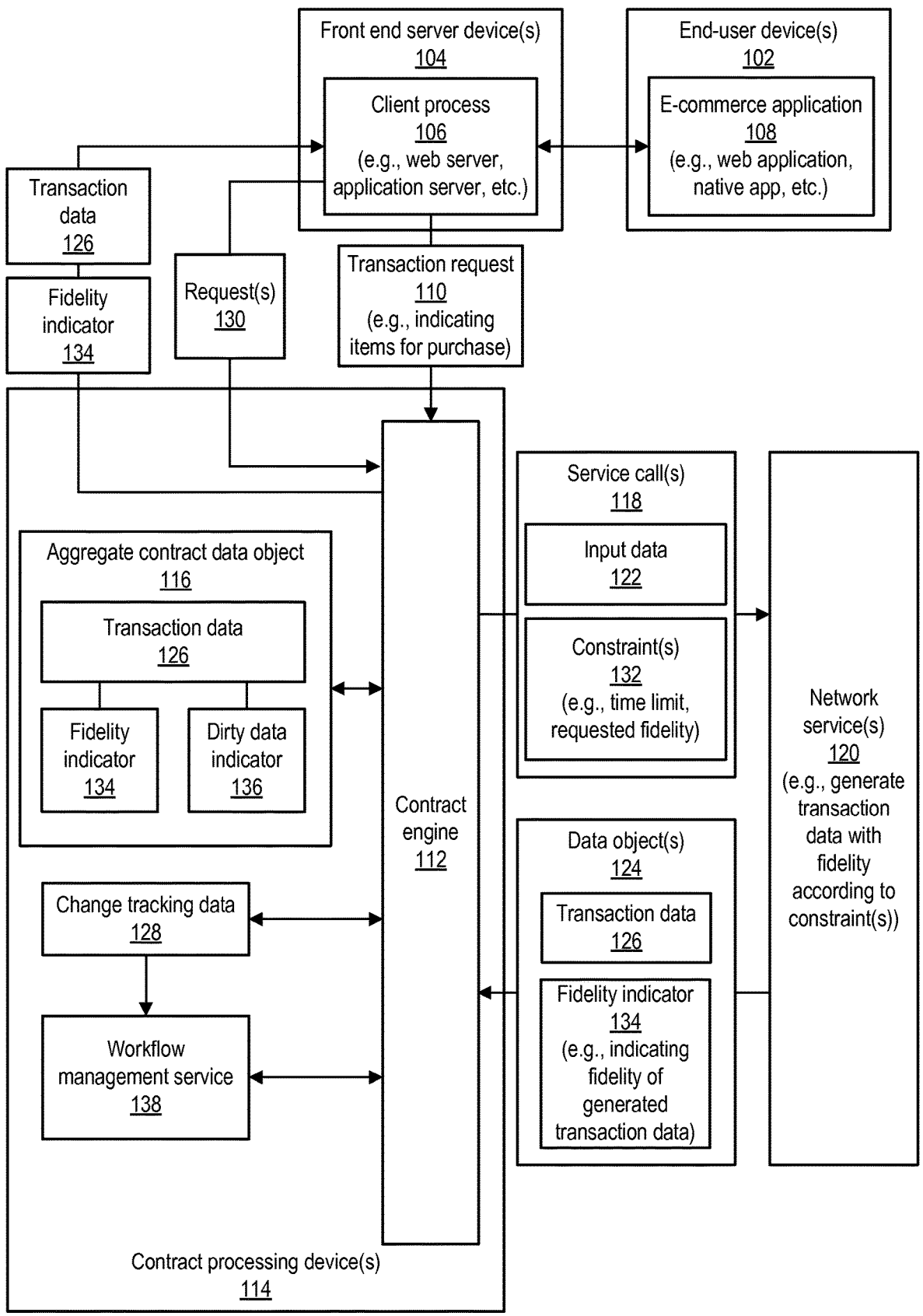
FIG. 1 is a block diagram illustrating an example environment in which a contract engine performs calls to multiple instances of a network service to generate transaction data of varying fidelity, according to embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems, devices, methods, and computer-readable media for processing transaction requests generated by client processes, and providing transaction data to the client processes describing the transaction, wherein the transaction data may be generated by network service(s) at a fidelity that is determined based on one or more constraints. In some embodiments, a transaction request is received from a client process, such as a web server, application server, or other front-end process configured to provide content to be presented in a web application, native application, or other user interface (UI). In some cases, the transaction request may be associated with a plurality of items identified by an end-user using the UI. For example, a transaction request may identify one or more items for purchase via an e-commerce application such as an online store, merchant web site, shopping application, and so forth. The transaction request may be accessed and analyzed by a contract engine configured to call one or more network services. The call(s) may cause the network service(s) to generate one or more portions of transaction data for the transaction. The network service(s) may communicate one or more portions of transaction data to the contract engine in one or more data objects, and the contract engine may incorporate the portion(s) of transaction data into an aggregate data object. The client process may receive transaction data from the aggregate data object and present at least a portion of the transaction data within an e-commerce application or other UI.

In some embodiments, the network service(s) may be configured to generate transaction data at various fidelity levels. As used herein, fidelity may indicate an accuracy of transaction data or a degree of variance of a calculated portion of transaction data relative to a highest fidelity (e.g., exact) version of that portion of the transaction data. For example, a network service may be configured to calculate an estimated delivery date for one or more items included in a purchase transaction. Fidelity may also indicate a quality of the transaction data, such as a likelihood that the generated transaction data corresponds to a correct or true value of the transaction data. The network service may generate a low fidelity version of the transaction data, e.g., an estimated delivery date of 3 to 5 days from a current date. The network service may generate the low fidelity version after minimal processing, such that the low fidelity transaction data may be returned to the contract engine with low latency. The network service may also generate one or more higher fidelity answers by analyzing various information related to the estimate of the delivery date, such as availability of the item at one or more fulfillment centers, availability of delivery trucks, drones, delivery personnel, or other assets, time needed to acquire the item from a distributor, location of the delivery destination, current traffic or road conditions leading to the delivery destination, time of day, day of the year, or other factors. The network service may generate various higher fidelity answer(s) with greater latency than the low fidelity transaction data. In some cases, the network service may generate the highest fidelity answer based on when an item actually arrived at the delivery destination (e.g., the true delivery date). Accordingly, there may be a trade-off in latency versus fidelity, in that a higher fidelity version of the transaction data may take a longer time to generate and a lower fidelity version of the transaction data may take a shorter time to generate.

The contract engine may send a service call to instruct a network service to generate a particular portion of transaction data. In some embodiments, the service call may include one or more constraints on the generation of the portion of transaction data, such as a time limit, a requested fidelity, or other constraint(s). For example, the service call may request that the transaction data be generated at the highest fidelity possible within a particular time limit. As another example, the service call may request that the transaction data be generated at the highest fidelity possible, without any particular time limit, in cases where the contract engine is able to wait an indefinite time for the answer. In some cases, constraint(s) may be provided by the client process that sent the transaction request, and such constraint(s) may be passed along to the network service. For example, the client process may request a particular portion of transaction data be generated and provided to the client process as fast as possible, even if it is a low fidelity version of the transaction data.

In some embodiments, the contract engine may use default transaction data in place of the actual transaction data, in cases where a network service fails to generate the actual transaction data. By using the default transaction data, embodiments enable transaction processing to proceed even in cases where one or more network services have failed, gone down, are out of communication, or otherwise unavailable for transaction data generation. In some embodiments, a network service may determine a fidelity at which to generate transaction data based on a current processing load on the network service or based on other factors. This may enable a network service to continue processing transaction data requests even when subjected to a large number of requests or heavy processing load, by degrading its service and providing lower fidelity transaction data than it may otherwise provide under normal load conditions.

Embodiments may contrast with traditional systems in which the unavailability or failure of a network service may lead to an overall failure of the transaction. Moreover, traditional systems may provide a highest fidelity version of transaction data at all times, leading to a higher latency in presenting transaction data to end-users through an e-commerce application or other UI. By enabling the use of default data in cases where a network service is unavailable, and by enabling the network service(s) to provide transaction data with varying latency balanced against fidelity constraints, embodiments provide for a transaction processing system having a higher availability and lower overall latency than traditional systems. Embodiments may be described as separating the capture of transaction information from the processing of the transaction. For example, the information regarding the transaction may be received from the end-user via the e-commerce application, and processing may begin. The transaction may not fail even if no network services are available to generate transaction data, given that low fidelity transaction data may be provided and then replaced later with higher fidelity transaction data when the network service(s) are available. Thus, embodiments provide for a higher quality user experience than traditional systems. In some embodiments, the availability of the transaction processing system may be as high as 99.999%, corresponding to a down-time of approximately 5 minutes per year.

As used herein, a date may describe a particular date or range of dates according to any calendar. A date may include a day of the week (e.g., Wednesday), a day of the month (e.g., the 4th), a month of the year (e.g., January), year, and so forth. A date may also include an indication of date, time, or date and time relative to a current date or time (e.g., three days from now). A date may also include a time or range of times specified to any degree of precision, such as an hour, minute, second, fraction of second, and so forth.

As used herein, parallel processes may describe multiple processes that operate at least partly contemporaneously such that the durations of the processes at least partly overlap in time. Parallel processes may begin at different times, end at different times, or begin and end at different times, so long as there is a period of time (however short) during which both processes are operating simultaneously.

As used herein, a module may describe software that is executing or configured to be executable. A module may include, but is not limited to, one or more of an application, an app, a process, a thread, an executable library, an executable interface, and so forth. In some cases, a module may include elements that are presented to a user such as in a UI. Such elements may be configured to output information to the user, receive input information from the user, or to both provide output and receive input. In some cases, a module may include an interface or other elements for exchanging information with other module(s), such as an application programming interface (API). A module may include machine-executable instructions that execute on a processor to perform actions. A module may also include bytecodes, intermediate language instructions, scripts, or other data that is configured to execute with a virtual machine (VM), runtime engine, or other process.

As used herein a synchronous process may describe a process that is initiated in response to, or within a same execution path, as a triggering event or condition. A synchronous process may also be described as being performed dynamically or in real time with respect to the triggering event or condition, within a predetermined (e.g., brief) period of time relative to the occurrence of the triggering event or condition. For example, the processing of a request to generate a response may be described as synchronous, with respect to receiving the request, if a particular process receives the request and responds to the request within a same execution path. The synchronous processing of a request to generate a response may be described as a blocking operation, in that the responder may not process other requests until the initial request is processed and a response is sent.

As used herein, an asynchronous process may describe a process that operates out-of-band or offline with respect to a triggering event or condition. An asynchronous process may also be described as a static process or batch process. For example, the processing of a request to generate a response may be described as asynchronous, with respect to receiving the request, if the responder generates and sends a response at a time or via a process that is, to some extent, independent of the timing of receiving the request.

As used herein, a data object may include any amount of data arranged in any format, or unformatted data. A data object may include data that is encrypted using any encrypted method or unencrypted. A data object may include data that is compressed using any compression algorithm or uncompressed. A data object may be stored in persistent memory. A data object may also be present in active, physical memory employed by a module.

As used herein, a transaction may describe any scenario in which a requester, such as an end-user or module, requests processing of data to generate transaction data. A transaction may include, but is not limited to, a purchase, refund, or other commercial transaction. Although examples herein may describe a transaction as a purchase transaction to purchase one or more items via an e-commerce application, embodiments are not limited to this particular type of transaction.

FIG. 1 illustrates an example environment in which one or more embodiments may operate. As shown in FIG. 1, the environment may include one or more end-user devices 102. The end-user device(s) 102 may include any type of computing device, including but not limited to tablet computers, laptop computers, desktop computers, telephones, gaming device, home entertainment system, and so forth. The environment may also include one or more front end server devices 104. The front end server device(s) 104 may execute any number of client processes 106. The client process(es) 106 may be configured to generate an e-commerce application 108, or any other type of application, for presentation on the end-user device(s) 102. For example, the client process(es) 106 may include a web server, application server, or other software module(s) configured to provide an e-commerce application 108 comprising one or more web pages that may be presented through a web browser executing on the end-user device(s) 102. The client process(es) 106 may also be configured to generate and communicate content to be presented on other types of e-commerce applications 108. For example, the e-commerce application 108 may be a native application configured to execute on the end-user device(s) 102, and the e-commerce application 108 may present content generated and provided by the client process(es) 106.

The client process(es) 106 may communicate one or more transaction requests 110 to a contract engine 112 executing on one or more contract processing device(s) 114. In some embodiments, the contract processing device(s) 114 may include one or more backend server devices that operate within a system for providing an e-commerce service to end-users. In such cases, the contract engine 112 may include any number of software modules that execute to receive, generate, send, or otherwise process data related to a contract within the e-commerce service. For example, the contract engine 112 may process a purchase contract or other type of contract arising from an end-user's selection of one or more items to be purchased via the e-commerce application 108. In some embodiments, the contract engine 112 may be a backend service that is not directly accessible by end-users (e.g., customers). Alternatively, the contract engine 112 may provide a UI or other features configured to interact directly with an end-user. The contract engine 112 may be configured to support contract creation, aggregation, validation, signing, or other operations with respect to a contract for a transaction.

The client process(es) 106 may include front end processes that provide content for the e-commerce application 108 having an interface, such as a web interface or other UI accessible by end-users of the end-user device(s) 102. The action(s) of an end-user in the UI provided by the client process(es) 106 may generate one or more transaction requests 110 that are processed by the contract engine 112. For example, and end-user may select one or more items for purchase through the e-commerce application 108 such as an online store, e-commerce web site, shopping app, or other UI provided by the client process(es) 106. The client process(es) 106 may then generate the transaction request(s) 110 to indicate that a purchase contract is to be created to manage the end-user's purchase of the item(s) through the e-commerce application 108. The contract engine 112 may generate an aggregate contract data object 116 that includes transaction data 126 associated with the contract. In some cases, at least some of the transaction data 126 included in the aggregate contract data object 116 may be communicated to the client process(es) 106 and presented, through the e-commerce application 108, to the end-user whose interaction(s) with the e-commerce application 108 caused the transaction request(s) 110 to be sent.

In some embodiments, the contract engine 112 may make any number of service calls 118 to network services 120, to cause the network service(s) 120 to generate the transaction data 126 to store in, or otherwise incorporate into, the aggregate contract data object 116. In response to receiving a transaction request 110 from the client process(es) 106, contract engine 112 may initialize the aggregate contract data object 116 and begin sending the service call(s) 118 to instruct the network service(s) 120 to generate the transaction data 126 to store in the aggregate contract data object 116. For example, in cases where the transaction request 110 indicates a purchase of one or more items through the e-commerce application 108, the aggregate contract data object 116 may include transaction data describing one or more aspects of the contract governing the purchase. The aggregate contract data object 116 may store any amount of transaction data 126 that describes any aspect of the contract including, but not limited to, the purchase price, taxes, discounts, gift information, item(s) to be purchased, description of item(s), quantity of item(s) to be purchased, availability of item(s), shipping date or time estimate, shipping method, requested delivery period, seller of the item(s), manufacturer of the item(s), buyer's name, recipient's name, buyer's location, recipient's location, shipping address, payment information, and so forth.

On receiving the transaction request 110, the contract engine 112 may create an initial version of the aggregate contract data object 116. The initial aggregate contract data object 116 may include information that the contract engine 112 is able to determine based on the transaction request 110 itself, but the initial aggregate contract data object 116 may otherwise be a shell object into which subsequently generated transaction data 126 is to be written. To populate the aggregate contract data object 116, the contract engine 112 may perform any number of service calls 118 to one or more network services 120. Each service call 118 may include input data 122, and may call a network service 120 that is configured to process the input data 122 and generate transaction data 126 based on the input data 122. For example, the contract engine 112 may perform a service call 118 that includes input data 122 describing the purchase price of item(s) in a purchase, and location information regarding the buyer. The service call 118 may be to a network service 120 that is configured to calculate an amount of tax to be paid with the purchase, based on the purchase price and the location information, or other input data 122. The network service 120 may generate and return transaction data 126 that includes the calculated amount of tax. The contract engine 112 may then incorporate the received transaction data 120 into the aggregate contract data object 116. Alternatively, one or more network services 120 may have (e.g., direct) access to the aggregate contract data object 116, and may be configured to store the transaction data 126 in the aggregate contract data object 116 without sending the transaction data 126 to the contract engine 112.

The network service(s) 120 may be configured to perform operations including, but not limited to, one or more of the following: calculate taxes based on purchase price, location, or other input data; determine availability of item(s) to be purchased; determine an estimated delivery time, date, or time and date for delivering purchased item(s); validate or process a gift certificate, credit card, bank card, store credit, or other method of purchase; process gift information, such as a gift certificate amount, gift message, gift wrapping options, and so forth; determine address information, contact information, or other stored data associated with a buyer or recipient of a purchase; determine information describing the seller, manufacturer, distributor, or other entity associated with the item(s); or other operation(s).

In some embodiments, the network service(s) 120 may be remote with respect to the contract engine 112, executing on different computing device(s) than the contract engine 112. In such cases, the service call(s) 118 and the transaction data 126 may be communicated over one or more networks such as wide area networks (WANs) or local area networks (LANs). In some cases, one or more of the service call(s) 118 or the transaction data 126 may be encrypted for communication. In some embodiments, one or more of the network services 120 may be a local service with respect to the contract engine 112, such that the network service(s) 120 execute on a same computing device or cluster of devices as the contract engine 112.

In some embodiments, the contract engine 112 may generate change tracking data 128. The change tracking data 128 may describe the transaction data 126 that has been added to the aggregate contract data object 116. The change tracking data 128 may also describe one or more portions of transaction data 126 to be added to the aggregate contract data object 116, and which network service(s) 120 are to be called to generate the transaction data 126. Accordingly, the change tracking data 128 may be described as a task list comprising: completed tasks, for which the transaction data 126 has been added to the aggregate contract data object 116; and incomplete tasks, for which the transaction data 126 has not yet been generated or added to the aggregate contract data object 116. The change tracking data 128 may indicate when particular instances of transaction data 126 were added to the aggregate contract data object 116, and which network service(s) 120 generated the transaction data 126. The change tracking data 128 may also indicate when the service call(s) 118 were made to the network service(s) 120 to request determination of transaction data 126 to be added to the aggregate contract data object 116.

In some embodiments, as shown in FIG. 1, the contract engine 112 may send the service call(s) 118 to the network service(s) 120, and receive the data object(s) 124 including the transaction data 126 from the network service 120. Alternatively, one or both of the sending of the service call(s) 118 or the receiving of the data object(s) 124 may be via a mediator service that may operate as an intermediary between the contract engine 112 and the network service(s) 120.

The contract engine 112 may be configured to generate, maintain, update, and provide an aggregate contract data object 116. In some embodiments, the contract engine 112 might be utilized in conjunction with software components and hardware devices that provide e-commerce functionality. For example, and without limitation, the technologies disclosed herein may be utilized with an online shopping or other e-commerce module (not shown) that provides a web site or other type of site for online shopping. The online shopping module may be configured to maintain and utilize an item catalog data store (e.g., an "item catalog") that stores records for items available for purchase through the web site. The web site may also provide functionality for browsing and searching for web pages corresponding to items in the item catalog, for purchasing the items, and for performing other functions. The technologies disclosed herein might also be utilized with other types of e-commerce systems. In this regard, it should be appreciated that the configurations disclosed herein are not limited to use by e-commerce systems and may be utilized to optimize the process of data aggregation in other technical environments.

In cases where the contract engine 112 is utilized in conjunction with an online shopping module, such as that described above, the aggregate contract data object 116 may be utilized to store data associated with a customer purchase such as purchase contract data. For example, and without limitation, the transaction data 126, and other information in the aggregate contract data object 116, may describe items to be purchased by the customer, payment information, customer information such as a billing or delivery address, or other types of information relating to a purchase contract. When the customer agrees to the terms of the purchase contract as reflected in the transaction data 126, e.g., when the customer "signs" the contract through an indication of agreement in the e-commerce application, the customer agreement (e.g., signing) may be indicated in the aggregate contract data object 116.

The contract engine 112 may obtain the data to be stored in the aggregate contract data object 116 from any number of the network services 120. For example, and without limitation, the contract engine 112 may make one or more service calls 118 that comprise one or more input values of input data 122 to the network service(s) 120. In response to the service call(s) 118, the network service(s) 120 may perform various types of processing to generate instances of the transaction data 126 for inclusion in the aggregate contract data object 116. Various other services may then access at least a portion of the transaction data 126 stored in the aggregate contract data object 116. In some cases, the client process(es) 106 may access the transaction data 126 of the aggregate contract data object 116 and present such data through the e-commerce application 108 or other UI. For example, the client process(es) 106 may access transaction data 126 describing an estimated delivery or shipping date for item(s), calculated tax to be paid, total cost, gift information, description(s) of item(s), seller information, or other transaction data 126 after such data has been stored in the aggregate contract data object 116. The client process(es) 106 may then cause at least a portion of the transaction data 126 to be presented to an end-user via the e-commerce application 108.

A transaction may include any number of items. In some embodiments, the contract engine 112 may analyze the transaction request 110 and determine that different items, or different subsets of items, may be processed separately and in parallel by one or more network service(s) 120. In such cases, the contract engine 112 may send multiple service calls 118 to multiple instances of a particular network service 120. Each of the multiple service calls 118 may specify, as input data 122, a different subset of one or more items. The multiple instances of the network service 120 may then execute, in parallel, to process the multiple subsets of (one or more) items and generate multiple instances of transaction data 126 that are communicated to the contract engine 112 in multiple data objects 124. For example, each item may be sent individually to a different instance of a network service 120 to calculate a tax amount associated with the purchase price of the item. As another example, each item may be sent individually to a different instance of a network service 120 to determine a (e.g., legal) seller of the item, or to retrieve other description information regarding the item.

Subsequent to sending the transaction request 110, the client process 106 may send one or more requests 130 for at least a portion of the transaction data 126 stored in the aggregate contract data object 116. In some embodiments, the request(s) 130 may be via an API that is exposed or otherwise provided by the contract engine 112. In receiving a request 130 that specifies a portion of the transaction data 126, the contract engine 112 may retrieve the specified portion of transaction data 126 from the aggregate contract data object 116 and send the specified portion of the transaction data 126 to the client process 106 in response to the request 130. In some embodiments, the specified portion of the transaction data 126 may be sent in a synchronous response to the request 130. In some embodiments, a portion or all of the transaction data 126 may be retrieved by the contract engine 112 from the aggregate contract data object 116 and sent to the client process 106 not in response to any particular request 130, but in a communication that is asynchronous with respect to the initial transaction request 110. In such cases, the transaction data 126 or a portion thereof may be sent to a network location (e.g., URL, address, port number, or other information) specified in callback information provided by the client process 106.

In some embodiments, as shown in FIG. 1, the contract engine 112 may incorporate the data objects 124, or the transaction data 126 communicated in the data objects 124, into the aggregate contract data object 116 as the data objects 124 are received by the contract engine 112. In some embodiments, the contract engine 112 may process the transaction data 126 prior to incorporating it into the aggregate contract data object 116. For example, in cases where multiple service call(s) 118 are made to instruct multiple instances of a network service 120 to generate multiple instances of transaction data 126 based on separate ones, or subsets, of items, the contract engine 112 may combine, correlate, merge, add, or otherwise process the multiple instances of transaction data 126 prior to incorporating the processed transaction data 126 into the aggregate contract data object 116.

In some embodiments, the contract engine 112 may send service call(s) 118 that include one or more constraints 132 on the generation of the transaction data 126 by the called network service 120. In some cases, the constraint(s) 132 may indicate a time limit for generating the transaction data 126. For example, the contract engine 112 may request that the network service 120 generate and provide the requested transaction data 126 within 2 seconds, 5 seconds, 30 seconds, or some other time limit after receiving the service call 118. In some cases, the constraint(s) 132 may indicate a requested fidelity for the generated transaction data 126. For example, the constraint(s) 132 may indicate that the network service 120 is to generate the highest fidelity transaction data 126 possible within a given time limit, or without a time limit. In some cases, the constraint9s) 132 may indicate that the network service 120 is to generate low fidelity transaction data 126 quickly, with low latency. Such fast, low latency information may enable the client process 106 to provide a fast, rough estimate of a portion of transaction data 126 to an end-user.

In some embodiments, the contract engine 112 may determine constraint(s) 132 based at least partly on information received from the client process 106 in the transaction request 110 or separately from the transaction request 110. For example, the client process 106 may indicate a time limit or a requested fidelity for at least a portion of the transaction data 126. In some cases, the client process 106 may request that a portion of transaction data 126 be provided quickly, within a short time limit, even if that data is low fidelity. In some cases, the client process 106 may request high fidelity transaction data 126, even if it takes longer to generate. In some embodiments, the client process 106 may indicate that the end-user has a particular characteristic (e.g., a premium membership, or the like), such that the service requirements for the end-user may be different than for other users. For example, the client process 106 may indicate that the end-user is a premium member and therefore the transaction data 126 is to be generated at a high fidelity.

In some embodiments, the network service 120 may determine a fidelity at which it is able to generate the transaction data 126. The network service 120 may make this determination based on a requested fidelity or a time limited indicated in the constraint(s) 132, or other constraint(s) 132. In some cases, the network service 120 may determine a fidelity based on other information, including but not limited to one or more of: a current processing load on the network service 120, such as a number of requests for transaction data 126 being currently handled by the network service 120; a size of the transaction data 126 to be generated, e.g., based on a number of items to process; an estimated time that the network service 120 may spend to generate the transaction data 126, e.g., based on historical information describing previous times for generating the same or similar data at various fidelities; or other factors. For example, the network service 120 may determine that it is able to generate transaction data 126 having a particular fidelity within the time limit indicated in the constraint(s) 132, given the current load on the network service 120 and the time needed to previously generate similar transaction data 126 of a similar size to the currently requested transaction data 126.

The network service 120 may generate and send a data object 124 to the contract engine 112, the data object 124 comprising the generated transaction data 126. In some embodiments, the data object 124 may also include a fidelity indicator 134 describing the fidelity at which the transaction data 126 was generated. Embodiments support the use of any format or data type for the fidelity indicator 134. In some embodiments, the fidelity indicator 134 may have a value from any number of discrete values or from a range of values. In some cases, the fidelity indicator 134 may be a numeric value, such as from 1 to 10, where a high (or low) value indicates high fidelity and a low (or high) value indicates low fidelity. The fidelity indicator 134 may also be descriptive, such as "high", "medium", "low", and so forth. In some cases, the fidelity indicator 134 may be a percentage in a range from 0% to 100%, where a high (or low) percentage indicates high fidelity and a low (or high) percentage indicates low fidelity.

In some cases, the network service 120 may generate the transaction data 126 at the requested fidelity indicated in the constraint(s) 132, even if the network service 120 is able to generate higher fidelity transaction data 126. Alternatively, the network service 120 may generate the transaction data 126 at a higher fidelity than the requested fidelity indicated in the constraint(s) 132, if the network service 120 is able to do so within the bounds of the other constraint(s) 132 such as a time limit. In some cases, the network service 120 may generate the transaction data 120 at a lower fidelity than the requested fidelity, such as in cases where the network service 120 is experiencing a heavy processing load. Embodiments support the generation of the transaction data 120 at a higher, lower, or same fidelity as the requested fidelity, if the constraint(s) 132 specify a requested fidelity.

In some embodiments, the fidelity indicator 134 describing the fidelity of a particular portion of transaction data 126 may be stored in the aggregate contract data object 116 with the transaction data 126. In some embodiments, the fidelity indicator 134 may also be incorporated into the change tracking data 128 to indicate that a particular portion of transaction data 126 was generated, by a network service 120, with the indicated fidelity.

In some embodiments, a portion of transaction data 126 may depend on other portion(s) of transaction data 126, referred to herein as dependency transaction data 126. Dependency transaction data 126 may be employed by a network service 120 to generate other transaction data 126, such that the dependency transaction data 126 may be described as precursor or antecedent data. For example, a portion of transaction data 126 describing the total price of an order may depend on other portions of transaction data 126 describing the item(s) in the order. If the item(s) in the order change, e.g., if an end-user adds or removes items from the order, the total price may be recalculated. In some embodiments, the transaction data 126 may be stored in the aggregate contract data object 116 with a dirty data indicator 136 (e.g., a dirty bit). A value of the dirty data indicator 136 may indicate, for a particular portion of transaction data 126, whether the current version of the transaction data 126 depends on other dependency data that has changed since the transaction data 126 was generated. For example, the dirty data indicator 136 may be a binary data element for which a value of "true" or 1 indicates that the dependency data for a portion of transaction data 126 has changed since the transaction data 126 was generated. A value of "false" or 0 may indicate that the dependency data for a portion of transaction data 126 has not changed since the transaction data 126 was generated. If the dirty data indicator 136 indicates that dependency data has changed, the contract engine 112 may send a subsequent service call 118 to instruct a network service 120 to recalculate or otherwise regenerate the portion of transaction data 126 based on input data 122 that is the changed dependency data. The contract engine 112 may then receive a data object 124 that includes the updated transaction data 126, and incorporate the updated transaction data 126 into the aggregate contract data object 116 in place of the previously stored (e.g., and now out of date) transaction data 126.

In some embodiments, the contract processing device(s) 114 or other computing device(s) may execute a workflow management service 138. The workflow management service 138 may access one or both of the change tracking data 128 or the aggregate contract data object 116 and based on information therein determine whether the additional transaction data 126 is to be added to the aggregate contract data object 116. In some embodiments, the workflow management service 138 may also determine whether portion(s) of transaction data 126 currently stored in the aggregate contract data object 116 are out of date, based on the dirty data indicator(s) 136 for the portion(s). If any portion(s) of transaction data 126 depend on dependency data that has changed, the workflow management service 138 may send an instruction to cause the contract engine 112 to send a service call 118 requesting updated transaction data 126 from a network service 120. The workflow management service 138 may also determine whether any transaction data 126 is missing from the aggregate contract data object 116, based on the change tracking data 128, and send instruction(s) to cause the contract engine 112 to send service call(s) 118 requesting that the missing transaction data 126 be generated.

In some embodiments, the workflow management service 138 may determine that a portion of transaction data 126 stored in the aggregate contract data object 116 has a lower fidelity than a network service 120 is capable of generating. In such cases, the workflow management service 138 may send an instruction that causes the contract engine 112 to send a service 118 to request that the network service 120 regenerate the transaction data 126 at a higher fidelity. In such cases, the contract engine 112 may include, in the constraint(s) 132 sent with the service call 118, a requested fidelity that is the highest fidelity capable being generated by the network service 120. The workflow management service 138 may periodically examine one or both of the change tracking data 128 or the aggregate contract data object 116. On finding that portion(s) of transaction data 126 are missing, the workflow management service 138 may instruct the contract engine 112 to request that network service(s) 120 generate the missing transaction data 126 to incorporate into the aggregate contract data object 116. On finding that portion(s) of transaction data 126 are out of date, based on the dirty data indicator 136 indicating changed dependency data, the workflow management service 138 may instruct the contract engine 112 to request that network service(s) 120 generate updated transaction data 126 to incorporate into the aggregate contract data object 116. On finding that portion(s) of transaction data 126 are at a lower fidelity than possible, the workflow management service 138 may instruct the contract engine 112 to request that network service(s) 120 generate higher fidelity, or the highest possible fidelity, transaction data 126 to incorporate into the aggregate contract data object 116. In this way, embodiments may employ the workflow management service 138 to drive the contract engine 112 to complete the process of acquiring high fidelity, complete, and up to date transaction data 126 to include in the aggregate contract data object 116 for a transaction. Although examples herein may describing the workflow management service 138 as prompting the updating of transaction data 126 in the aggregate contract data object 116, embodiments are not so limited. In some embodiments, other module(s) or the contract engine 112 itself may determine that service call(s) 118 are to be made to request transaction data 126, updated transaction data 126, or higher fidelity transaction data 126 be generated.

In some embodiments, the client process 106 may receive transaction data 126 that has been stored in the aggregate contract data object 116, and may present at least a portion of the transaction data 126 in the e-commerce application 108. In some cases, the client process 106 may also receive the fidelity indicator 134 for one or more portion(s) of transaction data 126, and the presentation of the transaction data 126 may include some indication of the fidelity of the transaction data 126. In some embodiments, the client process 106 may send additional request(s) 130 requesting (e.g., higher fidelity) transaction data 126, and the contract engine 112 may send service call(s) 118 requesting higher fidelity transaction data 126 in response to the request(s) 130.

In some embodiments, the transaction data 126 for a transaction may be presented in the e-commerce application 108 to enable an end-user to agree to the terms of the contract as such terms are currently reflected in the transaction data 126. Such agreement may be described as the end-user signing the contract. In some cases, the end-user may agree to the contract based on transaction data 126 that is, at least in part, lower fidelity than possible. If the transaction data 126 is later replaced with higher fidelity transaction data 126 such that the terms of the contract are substantially altered, the end-user may be prompted to agree to the new, altered terms (e.g., re-sign the altered contract). For example, if the end-user agrees to a contract based on low fidelity transaction data 126 indicating a first total cost of the purchase, and the transaction data 126 is later replaced with higher quality transaction data 126 describing a different, higher total cost, the end-user may be informed of the changed and queried to determine whether they agree to the new terms. Such querying may be performed via the e-commerce application 108 or through a communication such as an e-mail, text message, social network message, and so forth.

In some cases, the terms of the contract may be presented to the end-user as a range of possible final terms, and the end-user may be asked whether they agree to a range of possible values for transaction data 126. For example, the terms of a contract may be presented, based on low fidelity transaction data 126, such that the total cost of a purchase is listed as between $10.50 and $10.75. If the end-user agrees to such terms, and the high fidelity calculated total cost is eventually determined as $10.60, then the contract may be deemed to be still valid and the end-user may not be prompted to agree to a new contract. In such cases, the end-user may be informed of the total cost as eventually determined. In this way, the latency of presenting transaction data 126 via the e-commerce application 108 may be reduced by selectively presenting lower fidelity transaction data 126 in situations where such lower fidelity information is appropriate and where the system is currently unable to, or delayed in, generating higher fidelity transaction data 126. Such lower latency delivery of lower fidelity, but still sufficiently accurate and informative, transaction data 126 may provide an enhanced user experience for an end-user compared to traditional techniques in which an e-commerce application 108 may not present any information until a complete set of high fidelity transaction data 126 is available.

Figure 2:
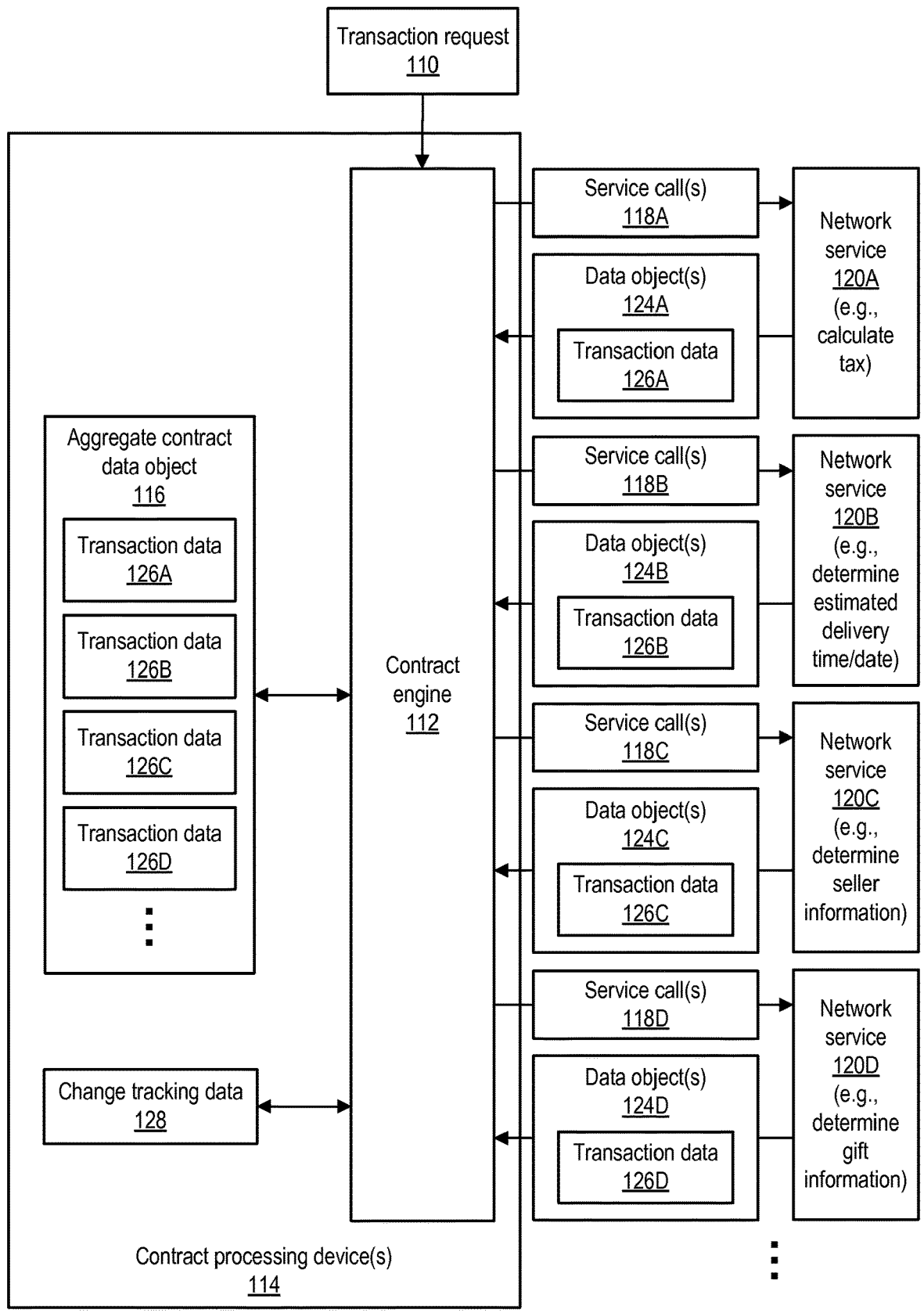
FIG. 2 is a block diagram illustrating an example environment in which a contract engine performs multiple calls to multiple network services to generate different types of transaction data to be stored in an aggregate data object, according to embodiments.

FIG. 2 illustrates an example of a contract engine 112 calling multiple network services 120 to generate different types of transaction data 126. In the example of FIG. 2, the contract engine 112 may make a service call 118A to a network service 120A to generate transaction data 126A describing a calculated tax amount for one or more items. The contract engine 112 may make a service call 118B to a network service 120B to generate transaction data 126B describing an estimated delivery date, or shipping date, for one or more items. The contract engine 112 may make a service call 118C to a network service 120C to generate transaction data 126C describing seller information for one or more items, or including other item description information. The contract engine 112 may make a service call 118D to a network service 120D to generate transaction data 126D gift information for one or more items, such as gift wrap options, gift messages, gift certificate amounts, and so forth. Other network service(s) 120 may generate other types of transaction data 126, including but not limited to payment information, discount amounts, refund information, and so forth. In some cases, a network service 120 may operate independently of other network service(s) 120, such that the timing or completion of the processing performed by the network service 120 may not depend on the operations of the other network service(s) 120. In some cases, a network service 120 may take, as the input data 120, dependency transaction data 126 that was previously generated by the operations of other network service(s) 120.

Each of the multiple instances of transaction data 126 may be sent to the contract engine 112, e.g., in a data object 124, and incorporated into the aggregate contract data object 116. For each of the network service(s) 120 available in the environment, the contract engine 112 may, if appropriate, make multiple service calls 118 to multiple instances of the network service 120 to cause the parallel processing of multiple portions of the transaction (e.g., multiple subsets of items). In some embodiments, the different calls to different network services 120A, 120B, 120C, 120D, and so forth, may also be made in parallel such that the different network services 120 execute in parallel to generate different types of transaction data 126. Accordingly, embodiments support at least two dimensions of parallel processing: parallel processing of different portions (e.g., different subsets of items) of the transaction; and parallel processing to generate different types of the transaction data 126 for a transaction.

When utilized in conjunction with an e-commerce system, the network service(s) 120 may be configured to provide various types of information about a customer purchase for storage in the aggregate contract data object 116 and use by the client process(es) 106 or other services. For example, and without limitation, one network service 120A may be utilized to provide transaction data 126A that includes a customer's shipping address, while another network service 120B may be configured to provide transaction data 126B that includes information about the item(s) to be purchased. Other network service(s) 120 may compute the sales tax for the purchase, the shipping cost, or the total purchase price for the purchase, and return the computed information as the transaction data 126 to the contract engine 112. Other network service(s) 120 may provide other types of transaction data 126. The transaction data 126 returned by the network service(s) 120 may be stored in the aggregate contract data object 116. The contract engine 112 may also provide functionality enabling the client process(es) 106 or other services to retrieve or modify the data stored in the aggregate contract data object 116.

In some cases, the types or instances of data stored in the aggregate contract data object 116 may have various dependencies, such that the modification of one portion or instance of dependency transaction data 126 may cause the updating of other portion(s) or instance(s) of transaction data 126. For example, if data is added to the aggregate contract data object 116 describing an additional item to be purchased by a customer, additional network service call(s) 118 may be made to network service(s) 120 to update the data in the aggregate contract data object 116 describing the total order price, the shipping cost, delivery estimates, whether free shipping is available, or other types of information. Other service call(s) 118 may be made based upon other changes or additions to the data in the aggregate contract data object 116. Changes to dependency data may be indicated in the dirty data indicator 136, as described above.

To update the transaction data 126 in the aggregate contract data object 116, the contract engine 112 may make one or more service calls 118 to the appropriate network service(s) 120. In some cases, a short period of time may have elapsed since a previous service call 118 such that the input data 122 to a network service 120 may not have changed since the previous call, and such that the transaction data 126 returned by the network service 120 is not likely to have changed. For example, if the items in a customer purchase from an e-commerce application 108 have not changed, then there may be a high probability that there is no change in the shipping cost for the item(s), unless other data has since changed that may impact the shipping cost, such as the shipping address. In this example, a service call 118 may be made to a network service 120 unnecessarily, thereby increasing latency or reducing availability of the network service 120 or the contract engine 112. This may be particularly true when there is a large amount of data in the aggregate contract data object 116 or when there are a large number of network services 120 to be called. Accordingly, in some embodiments at least a portion of the transaction data 126 may be accessed from a cache instead of repeating a service call 118 to a network service 120, in cases where the transaction data 126 is unlikely to have changed since a previous call. In some embodiments, the data may be cached with a time-to-live (TTL) indicating how long since the data has been cached and how fresh the cached data is. Cached data with a high TTL may be not used, and instead a service call 118 may be made to request updated transaction data 126 from the network service 120. Older cached data may be purged from the cache, and replaced with updated transaction data 126.

Another mechanism that the contract engine 112 may utilize to avoid unnecessary network service calls 118 to network services 120 involves the use of the change tracking data 128. In some embodiments, the contract engine 112 may be configured to track changes to data in the aggregate contract data object 116. For example, and without limitation, the contract engine 112 may maintain the change tracking data 128 that describes the changes to the various instances of transaction data 126 in the aggregate contract data object 116. When the contract engine 112 determines that a second or subsequent call to a network service 120 may be necessary (e.g. as a result of the modification of dependency data in the aggregate contract data object 116), the contract engine 112 may employ the change tracking data 128 to determine whether the data in the aggregate contract data object 116 that is used as input data 122 to the network service 120 has changed since the previous service call 118 to the network service 120. If the change tracking data 128 indicates that the input data 122 has not changed, the contract engine 112 may not make an additional service call 118 to the network service 120. The caching mechanism and the change tracking mechanism described above may be utilized in any combination in some embodiments.

The contract engine 112 may also utilize a filtering mechanism to perform caching on a more granular level than at the level of a single instance of transaction data 126, and to make communication with the network service(s) 120 more efficient. The network service(s) 120 may be configured to provide filtering data to the contract engine 112. The filtering data may describe the particular portion(s) of data from the aggregate contract data object 116 that each network service 120 utilizes as input data 122. For example, and without limitation, a network service 120A may provide filtering data indicating that the network service 120A is to be subsequently called if (e.g., only if) particular field(s) of transaction data 126 are changed in the aggregate contract data object 116. Similarly, a network service 120B might provide filtering data indicating that the network service 120B is to be subsequently called if other field(s) are changed. Based on the filtering data, the contract engine 112 may call network service(s) 120 a subsequent time if the data specified by the network service(s) 120 in the filtering data has changed (and the associated TTL has not elapsed). Additionally, the contract engine 112 may utilize the filtering data to minimize the amount of data sent to a network service 120 in a service call 118. For example, the field(s) specified in the filtering data may be provided to the network service(s) 120 as input data 122.

In some cases, the contract engine 112 may be configured to be expandable to support additional network service(s) 120 providing additional transaction data 126. In some embodiments, a new network service 120 may register itself with the contract engine 112 to indicate one or more of: the particular transaction data 126 that may be provided by the network service 120; or the particular input data 122 that may be sent to request the service generated data 210. Following registration, the contract engine 112 may then begin sending service call(s) 118 to the newly registered network service 120 to request transaction data 126 to populate the aggregate contract data object 116. Accordingly, the contract engine 112 may be described as having a pluggable architecture to facilitate bringing new network service(s) 120 online, and the network service(s) 120 may be described as plug-in(s) to the contract engine 112.

Figure 3:
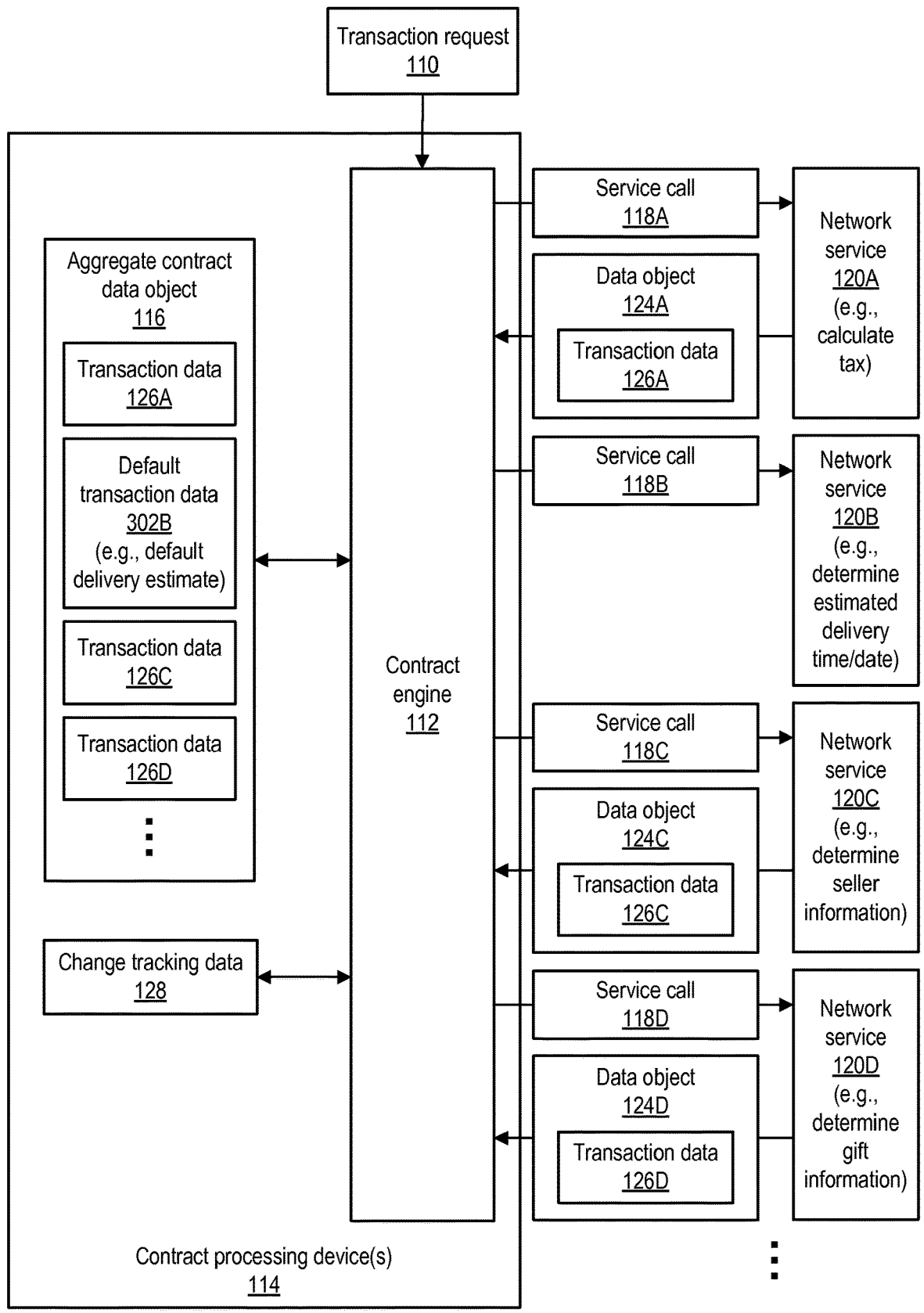
FIG. 3 is a block diagram illustrating an example environment in which a contract engine performs multiple calls to multiple network services to generate different types of transaction data, and in which default transaction data is employed as a placeholder pending generation of actual transaction data, according to embodiments.

FIG. 3 depicts an example environment in which default transaction data 302 may be employed as a placeholder for one or more instances of transaction data 126, in cases where the generation or communication of the actual transaction data 126 is delayed or where the network service 120 that would otherwise generate the actual transaction data 126 fails or is unavailable. FIG. 3 depicts a similar example to that shown in FIG. 3, in which the contract engine 112 makes four service calls 118 to four different network services 120 to prompt the generation of four different types of transaction data 126. In the example of FIG. 3, the service calls 118A, 118C, and 118D are successful in that the corresponding network services 120A, 120C, and 120D generate and return the requested transaction data 126A, 126C, and 126D within a predetermined period of time. In this example, the network service 120B (e.g., for delivery date estimation) has not returned transaction data 126 providing a delivery date estimation. Accordingly, the contract engine 112 may determine the default transaction data 302B for the network service 120, and incorporate the default transaction data 302B (e.g., "5 days") into the aggregate contract data object 116 in place of actual transaction data 126B, e.g., the actual estimated delivery date that would be generated by a successful operation of the network service 120B. Later, if the network service 120B provides the actual transaction data 126B, e.g., the actual estimated delivery date, the contract engine 112 may replace the default transaction data 302B with the actual transaction data 126B in the aggregate contract data object 116.

In some embodiments, the default transaction data 302 may be determined, and stored in memory that is accessible to the contract engine 112, during the registration of the network service 120. In cases where default transaction data 302 is employed in place of the actual transaction data 126, e.g., when the actual transaction data 126 has not been generated by the network service 120 at any fidelity, the default transaction data 302 may be incorporated into the aggregate contract data object 116 with a fidelity indicator 134 indicating that the data is a low (e.g., the lowest) fidelity. The workflow management service 138 may detect that low fidelity transaction data 126 is present in the aggregate contract data object 116, and cause the contract engine 112 to send another service call 118 to request that the network service 120 generate actual transaction data 126 at a higher fidelity than the low fidelity default transaction data 302.

Figure 4:
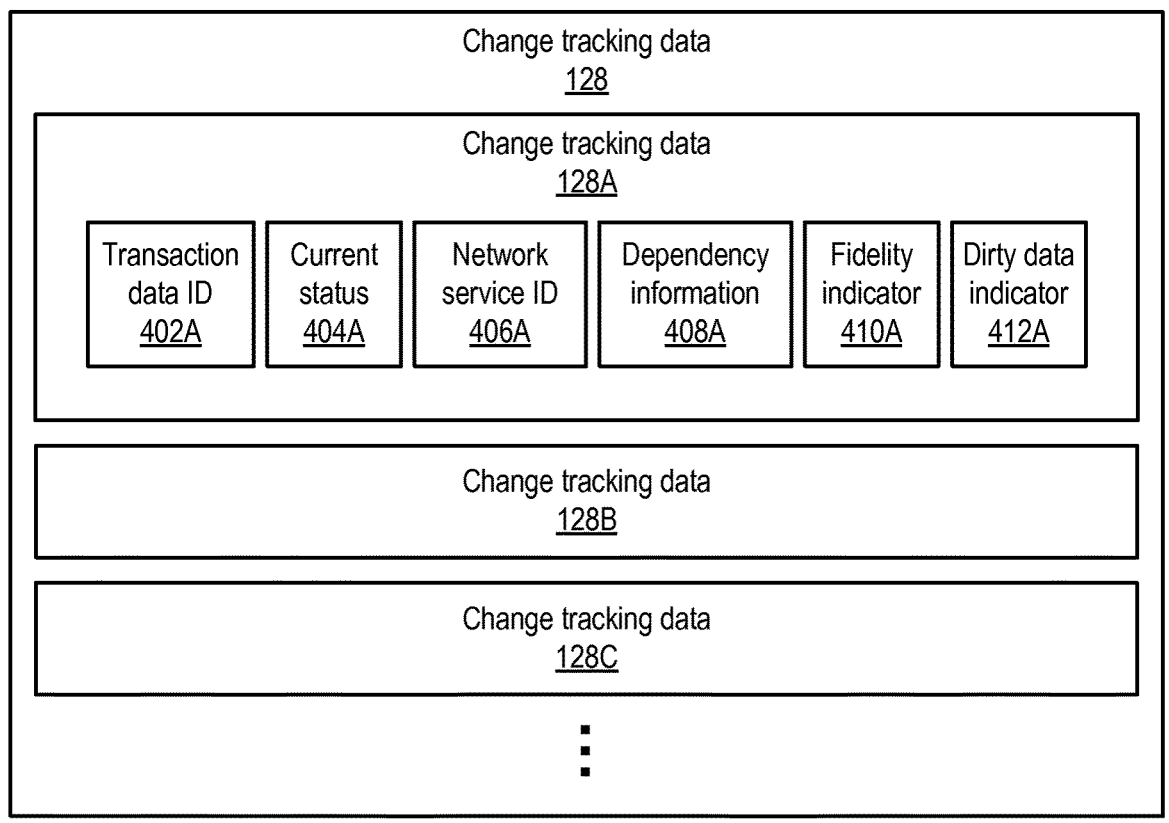
FIG. 4 is a block diagram illustrating an example of change tracking data describing transaction data that has been added, or that is yet to be added, to an aggregate contract data object for a particular transaction, according to embodiments.

FIG. 4 is a block diagram illustrating an example of change tracking data 128. As described above, the change tracking data 128 may indicate one or more portion(s) of transaction data 126 that has been added, or that is yet to be added, to an aggregate contract data object 116 for a particular transaction. As shown in the example of FIG. 4, the change tracking data 128 may include any number of instances of change tracking data 128 each corresponding to a particular portion of transaction data 126 for a transaction. An instance of change tracking data 128A may include a transaction data identifier (ID) 402A indicating a particular portion of transaction data 126 for a transaction. The change tracking data 128A may include a current status 404A describing the status of this portion of transaction data 126, such as whether a version of the portion of transaction data 126 is currently stored in the aggregate contract data object 116 or whether the portion of transaction data 126 is yet to be generated and stored. The change tracking data 128A may include a network service ID 406A indicating a particular network service 120 that executed, or is executable, to generate the portion of transaction data 126. The change tracking data 128A may include dependency information 408A describing one or more portions of dependency transaction data 126 on which this portion of transaction data 126 depends. The change tracking data 128A may include a fidelity indicator 410A indicating a fidelity of the portion of transaction data 126 currently stored in the aggregate contract data object 116. The change tracking data 128A may also include a dirty data indicator 412A indicating whether dependency data for this portion of transaction data 126 has changed since the currently stored portion of transaction data 126 was generated. The change tracking data 128A may also include other data elements.

The particular arrangement, order, and composition of the change tracking data 128 shown in the example of FIG. 4 is not limiting of embodiments. Embodiments support the use of change tracking data 128 that includes more or fewer data elements, or that includes data elements in any order. The change tracking data 128 may include any amount of data, of any type, arranged according to any data format or unformatted. The change tracking data 128 may be encrypted or unencrypted, compressed or uncompressed.

Figure 5:
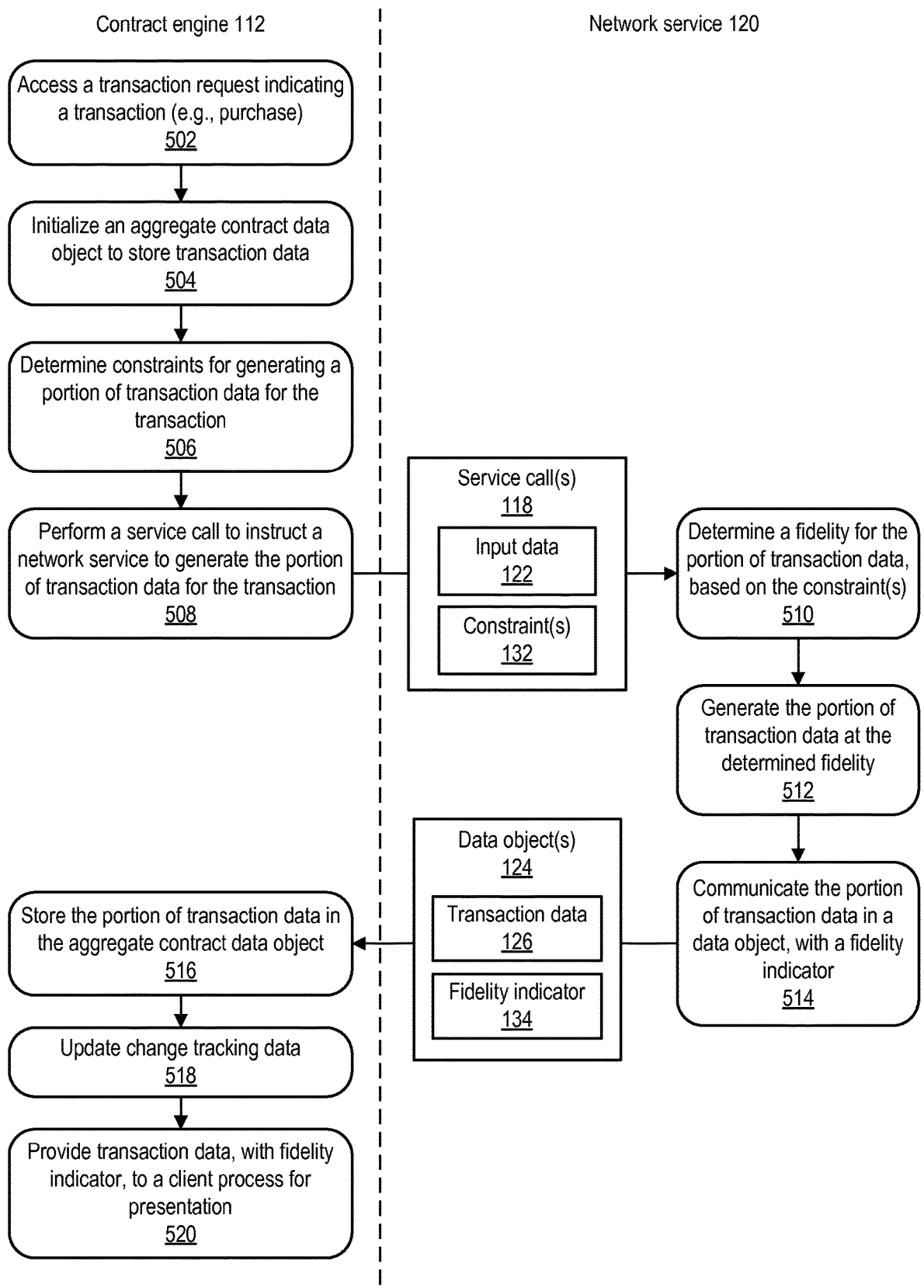
FIG. 5 is a flow diagram illustrating one or more embodiments of a process for performing a call to a network service to generate transaction data with a fidelity according to constraint(s).

FIG. 5 is a flow diagram illustrating one or more embodiments of a process for performing a service call 118 to a network service 120 to generate transaction data 126 with a fidelity according to constraint(s) 132, as described above. Operations of the process may be performed by one or more of the e-commerce application 108, the client process 106, the contract engine 112, the network service(s) 120, the workflow management service 138, or other module(s) executing on the contract processing device(s) 114, the end-user device(s) 102, the front end server device(s) 104, or other computing device(s).

At 502, the contract engine 112 may receive or otherwise access a transaction request 110 indicating a transaction, such as a purchase indicated through end-user input to the e-commerce application 108.

At 504, in some embodiments the contract engine 112 may initialize an aggregate contract data object 116 to store the transaction data 126 for the transaction.

At 506, the contract engine 112 may determine a set of (one or more) constraints 132 to be specified for generating a portion of the transaction data 126. In some cases, the constraint(s) 132 may be determined based on information from the client process 106, such as information included in the transaction request 110. This determination is described further with reference to FIG. 6.

At 508, the contract engine 112 may perform a service call 118 to instruct a network service 120 to generate the portion of the transaction data 126 for the transaction. The service call 118 may include input data 122, such as dependency data to be used in generating the transaction data 126. The service call 118 may also include the constraint(s) 132. The service call 118 may be received, or otherwise accessed, by the network service 120.

At 510, the network service 120 may determine a fidelity at which to generate the requested transaction data 126. Such a determination is described further with reference to FIG. 7.

At 512, the network service 120 may generate the requested portion of transaction data 126 at the fidelity determined at 510.

At 514, the generated portion of transaction data 126 may be communicated to the contract engine 112 in a data object 124. As described above, in some embodiments the data object 124 may also include a fidelity indicator 134 indicating the fidelity at which the transaction data 126 was generated.

At 516, the contract engine 112 may receive the data object 124, extract the transaction data 126 from the data object 124, and store the transaction data 126 in the aggregate contract data object 116. The fidelity indicator 134 may also be incorporated into the aggregate contract data object 116 to indicate the fidelity of the currently stored portion of transaction data 126.

At 518, the change tracking data 128 may be updated to indicate that the transaction data 126 has been generated by the network service 120 and stored in the aggregate contract data object 116. The change tracking data 128 may also be updated into include the fidelity indicator 134 for the transaction data 126.

At 520, the transaction data 126 may be provided to the client process 106 for presentation via the e-commerce application 108. As described above, the transaction data 126 may be provided in response to a request 130 for the transaction data 126. In some embodiments, the transaction data 126 may be communicated to the client process 106 asynchronously via callback information provided by the client process 106. In some embodiments, the fidelity indicator 134 may also be provided to the client process 106. The client process 106 may present, in the e-commerce application 108, information indicating the fidelity of the presented transaction data 126.

In some embodiments, multiple requests to a network service 120 to generate transaction data 126 may be made via a single service call 118. For example, in some cases a total or overall tax amount is to be calculated for a purchase and incorporated into the aggregate contract data object 116, but a breakdown of the calculated tax into particular tax line items (e.g., state sales tax, local tax, etc.) may not be required for a particular transaction. In other cases, a breakdown of the tax may be needed. In both situations, a particular network service 120 may be called to calculate the various tax amounts or the total tax amount. In the first scenario, the network service 120 may be called to request the total tax amount. In the second scenario the network service 120 may be called to request the calculation of individual taxes in addition to or instead of the total tax amount, and such a request for individual tax amounts may be made via a single service call 118. In cases where the contract engine 112 is to call the same network service 120 to generate multiple portions of transaction data 126, the contract engine 112 may elect to make a single service call 118 to request the generation of the multiple portions of transaction data 126. Alternatively, the contract engine 112 may perform multiple service calls 118 to request the generation of the multiple portions of transaction data 126. In some cases, particular portion(s) of transaction data 126 may take longer for a network service 120 to generate compared to other portion(s). Accordingly, the higher latency portion(s) may be requested via separate service call(s) 118, to ensure that the lower latency transaction data 126 is made available in the aggregate contract data object 116 more quickly. The contract engine 112 may determine whether to consolidate service calls 118 to a same network service 120 based on latency metrics or other performance considerations.

Figure 6:
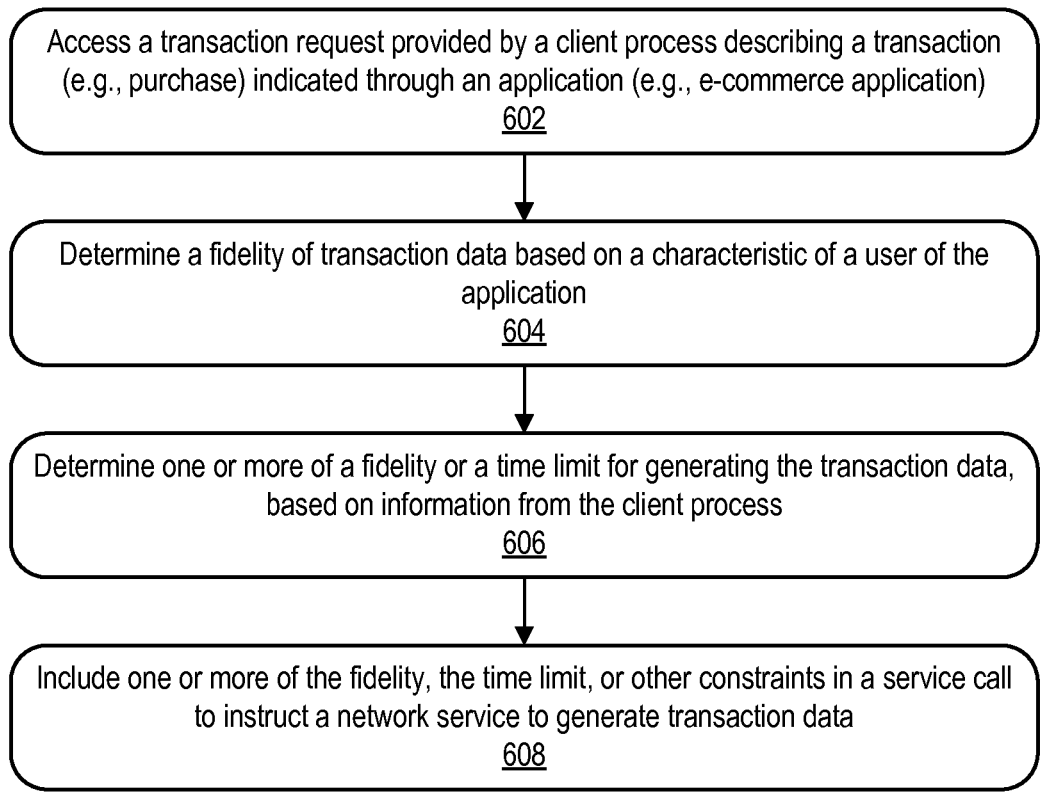
FIG. 6 is a flow diagram illustrating one or more embodiments of a process for determining constraint(s) to be specified in a service call to a network service.

FIG. 6 is a flow diagram illustrating one or more embodiments of a process for determining the constraint(s) 132 to be specified in a service call 118 to a network service 120. Operations of the process may be performed by one or more of the e-commerce application 108, the client process 106, the contract engine 112, the network service(s) 120, the workflow management service 138, or other module(s) executing on the contract processing device(s) 114, the end-user device(s) 102, the front end server device(s) 104, or other computing device(s).

At 602, the contract engine 112 may access the transaction request 110 sent by a client process 106. As described above, the transaction request 110 may describe a transaction indicated by an end-user through the e-commerce application 108.

At 604, in some embodiments a characteristic of the end-user who requested the transaction may be employed to determine a requested fidelity to include in the constraint(s) 132. For example, an e-commerce application 108 may support a premium membership for certain customers, and the contract engine 112 may be configured to request a higher fidelity for the initial generation of transaction data 126 to be presented to premium members.

At 606, in some embodiments other information from the client process 106 may be employed to determine a time limit, a requested fidelity, or other constraint(s) 132 to include in the service call 118 to cause the generation of the transaction data 126. For example, a client process 106 may request that transaction data 126 be generated quickly, within a particular time limit, even if the fidelity of such quickly generated transaction data 126 may be low. As another example, a client process 106 may request that the transaction data 126 be generated with a high fidelity, or with the highest available fidelity, even if such generation takes longer.

At 608, the requested fidelity, time limit, or other constraint(s) 132 may be included in the service call 118 made to instruct the network service 120 to generate the transaction data 126.

Embodiments support the use of various criteria for the contract engine 112 to determine the constraint(s) 132 to include in a service call 118. In some embodiments, as described above, the workflow management service 138 may prompt the contract engine 112 to send service call(s) 118 to fix up the transaction data 126 currently stored in the aggregate contract data object 116. For example, the workflow management service 138 may instruct the contract engine 112 to send service call(s) 118 to cause the generation of higher fidelity transaction data 126 than that currently stored in the aggregate contract data object 116, or to cause the generation of updated transaction data 126 based on changed dependency data. In some embodiments, when the contract engine 112 is sending service call(s) 118 that are prompted by the workflow management service 138, such service call(s) 118 may include constraint(s) 132 that specify the highest available fidelity for the generated transaction data 126. Accordingly, service call(s) 118 initiated by the contract engine 112 (e.g., in response to a transaction request 110) may be made to quickly generate transaction data 126 even if that data is lower fidelity. Subsequent service call(s) 118 driven by the workflow management service 138 may request the highest available fidelity of transaction data 126, given that such request(s) may not be as time-sensitive as the initial request(s) for (e.g., fast, but lower fidelity) transaction data 126.

Figure 7:
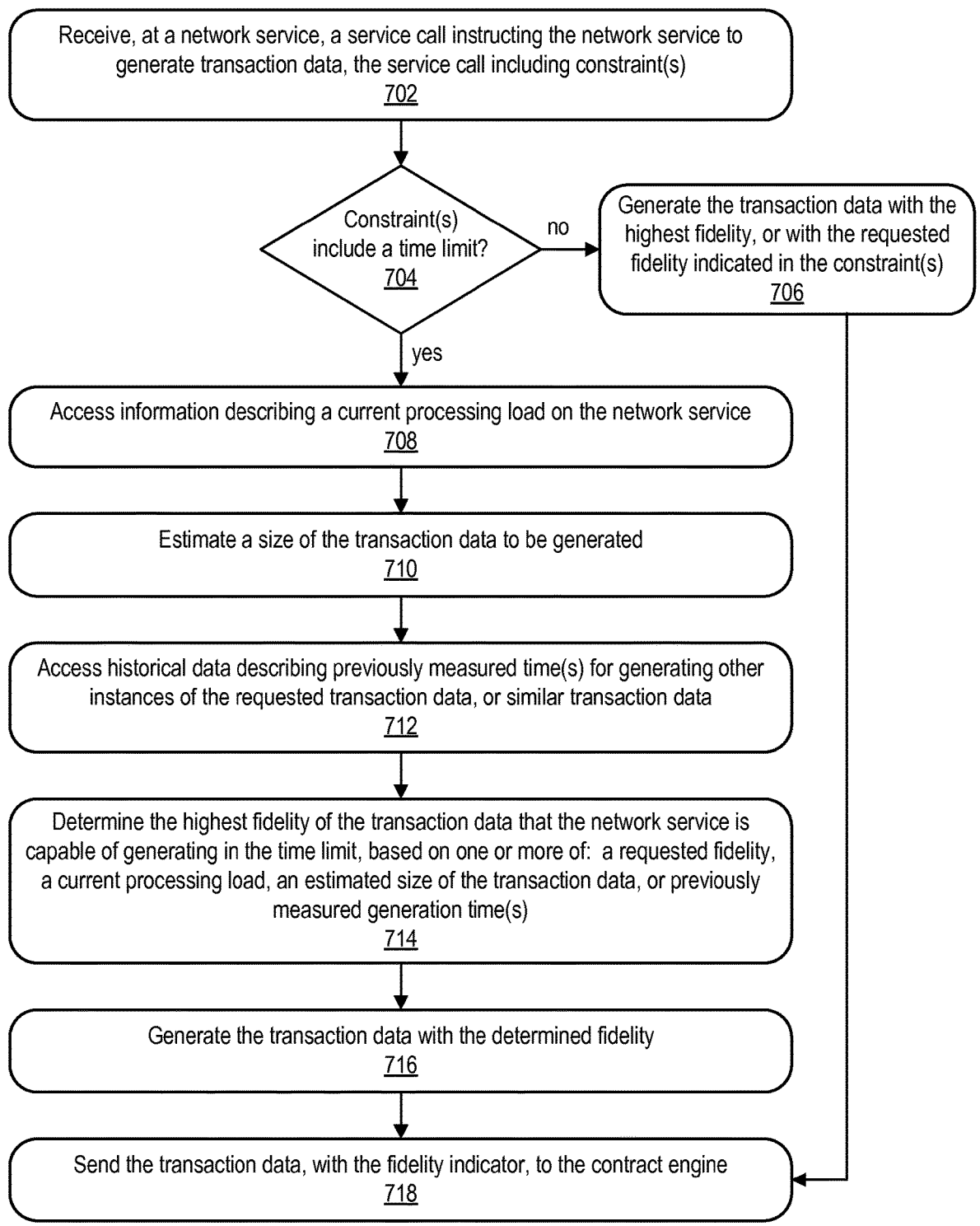
FIG. 7 is a flow diagram illustrating one or more embodiments of a process for determining a fidelity at which to generate transaction data.

FIG. 7 is a flow diagram illustrating one or more embodiments of a process for determining a fidelity at which to generate transaction data 126. Operations of the process may be performed by one or more of the e-commerce application 108, the client process 106, the contract engine 112, the network service(s) 120, the workflow management service 138, or other module(s) executing on the contract processing device(s) 114, the end-user device(s) 102, the front end server device(s) 104, or other computing device(s).

At 702, a network service 120 may receive a service call 118 instructing the network service 120 to generate a portion of transaction data 126. As described above, in some embodiments the service call 118 may include constraint(s) 132.

At 704, a determination is made whether the constraint(s) 132 include a time limit. If not, the process may proceed to 706.

At 706, the network service 120 may generate the requested portion of transaction data 126 with the highest fidelity given the capabilities of the network service 120. Alternatively, the network service 120 may generate the transaction data 126 at a fidelity indicated by a requested fidelity, in cases where the constraint(s) 132 include a requested fidelity. The process may then proceed to 718.

At 708, if the constraint(s) 132 include a time limit, the network service 120 may access information describing a current processing load being experienced by the network service 120.

At 710, in some embodiments an estimate may be made of the size of the transaction data 126 to be generated. Such an estimate may be based on a number of items specified in the input data 122 of the service call 118, or other considerations.

At 712, in some embodiments historical data may be accessed describing previously measured time(s) for generating other instance(s) of the requested transaction data 126 or similar transaction data 126.

At 714, the fidelity for the transaction data 126 may be determined based on one or more of the following: the requested fidelity, if included in the constraint(s) 132; the current processing load determined at 708; the estimated size of the transaction data 126 determined at 710, or the previously measured generation time(s) determined at 712. In some cases, the fidelity determined at 714 may be highest fidelity that the network service 120 is capable of generating within the time limit specified in the constraint(s) 132, as determined based on one or more of the listed criteria or other considerations.

At 716, the requested portion of transaction data 126 may be generated at the fidelity determined at 714.

At 718, the generated portion of transaction data 126 may be sent to the contract engine 112 in a data object 124. In some embodiments, the data object 124 may also include a fidelity indicator 134 indicating the fidelity of the transaction data 126 sent in the data object 124.

In some embodiments, the workflow management service 138, the contract engine 112, or some other module may drive the contract engine 112 to request that higher fidelity transaction data 126 be generated so long as the currently available transaction data 126 (e.g., in the aggregate contract data object 116) is at a lower fidelity than a maximum fidelity that the network service 120 is able to generate. Alternatively, in some cases it may be determined that the currently available transaction data 126 is at a sufficiently high fidelity for processing the transaction and obtaining the end-user's agreement to the terms reflected in the transaction data 126. For example, a lower fidelity delivery date estimate may be calculated as being within a range of five days (e.g., the order is estimated to arrive between Monday and Friday). Such an estimate may be sufficiently accurate to enable the end-user to agree to the terms of the purchase. Later, if a higher fidelity estimate is calculated outside that range, the end-user may be informed of the changed estimate and requested to agree to the changed terms of the purchase. If a higher fidelity estimate is later calculated within the range, the end-user may be informed of the revised delivery estimate (e.g., the order is estimated to arrive sometime Tuesday afternoon).

In some cases, the sufficient fidelity level of calculated transaction data 126 may depend on the type of transaction, the item(s) purchased, the buyer, the intended recipient, or other information regarding the transaction. For example, for a typical consumer purchase of goods a delivery estimate within a day may be sufficient. However, for another type of transaction, such as a purchase of fresh food to be delivered to a restaurant, a higher fidelity estimate (e.g., within an hour) may be generated.

Figure 8:
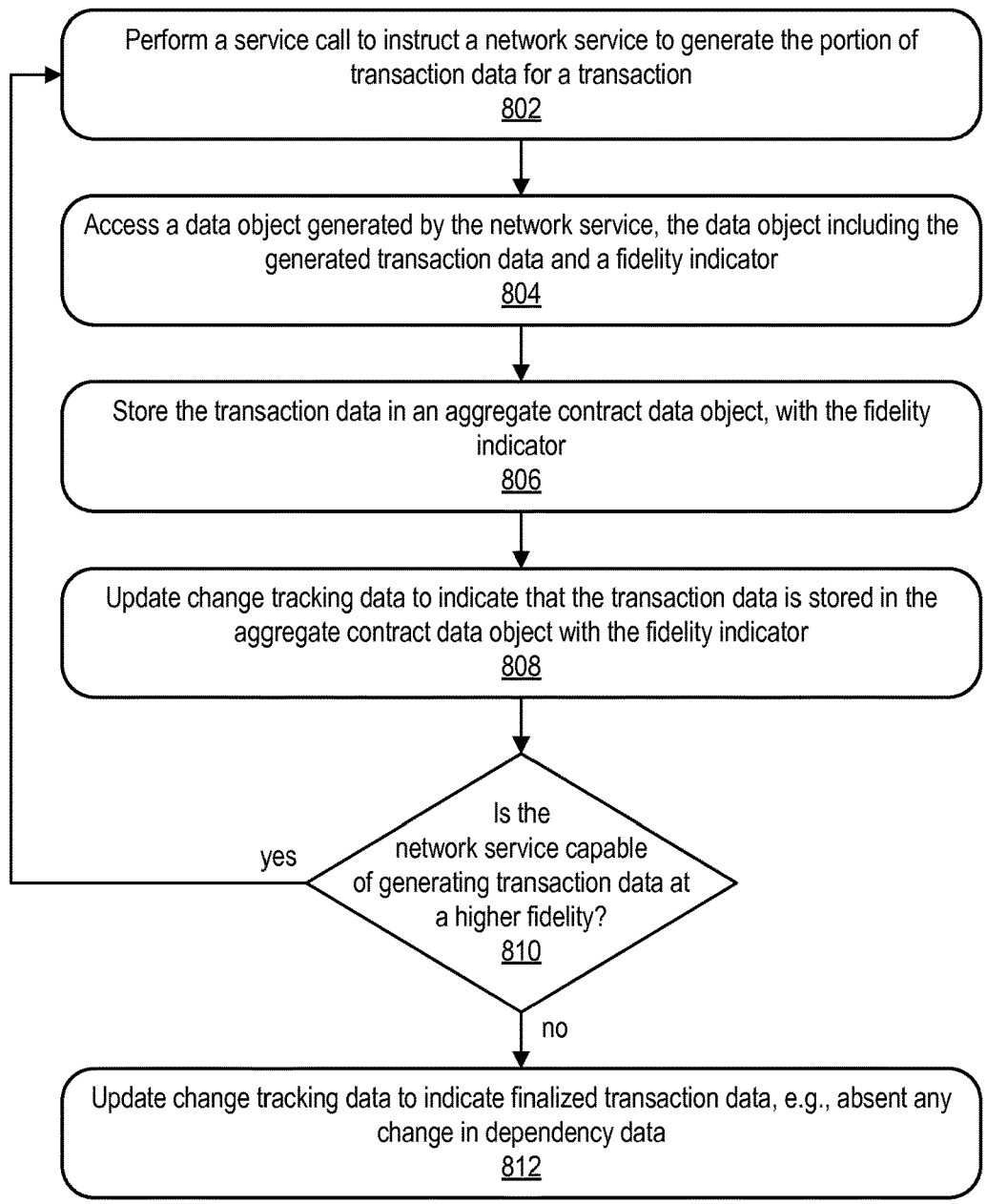
FIG. 8 is a flow diagram illustrating one or more embodiments of a process for performing one or more subsequent service calls to instruct a network service to generate transaction data at a higher fidelity than previously generated.

FIG. 8 is a flow diagram illustrating one or more embodiments of a process for performing one or more subsequent service calls 118 to instruct a network service 120 to generate transaction data 126 at a higher fidelity than previously generated. Operations of the process may be performed by one or more of the e-commerce application 108, the client process 106, the contract engine 112, the network service(s) 120, the workflow management service 138, or other module(s) executing on the contract processing device(s) 114, the end-user device(s) 102, the front end server device(s) 104, or other computing device(s).

At 802, a service call 118 may be performed by the contract engine 112 to instruct a network service 120 to generate a portion of transaction data 126, as described above.

At 804, a data object 124 may be received or otherwise accessed, the data object 124 including the portion of transaction data 126 generated by the network service 120 in response to the service call 118. The data object 124 may also include a fidelity indicator 134 for the transaction data 126.

At 806, the transaction data 126 may be stored in the aggregate contract data object 116. In some cases, the fidelity indicator 134 may also be included in the aggregate contract data object 116.

At 808, in some embodiments the change tracking data 128 may be updated to indicate that the transaction data 126 has been stored in the aggregate contract data object 116. As described above, in some embodiments the change tracking data 128 may include the fidelity indicator 134 indicating the fidelity of the stored transaction data 126.

At 810, a determination may be made whether the network service 120 is capable of generating a version of the transaction data 126 at a higher fidelity than that currently stored in the aggregate contract data object 116. If so, the process may return to 802 and send another service call 118 to request that the transaction data 126 be generated at the higher fidelity. In some cases, the determination that higher fidelity data may be generated may be made by the workflow management service 138, which may instruct the contract engine 112 to send the subsequent service call 118 to request higher fidelity transaction data 126 be generated. In some embodiments, the change tracking data 128 or the aggregate contract data object 116 may be periodically examined (e.g., at a predetermined frequency) by the workflow management service 138 or another module, to determine whether any portion of transaction data 126 may be regenerated at a higher fidelity than the data currently stored.

If it is determined that the network service 120 is not capable of generating higher fidelity transaction data 126, e.g., if the currently stored transaction data 126 is of the highest fidelity that may be generated by the network service 120, the process may proceed to 812. At 812, one or both of the change tracking data 128 or the aggregate contract data object 116 may be updated to indicate that the portion of transaction data 126 is in its final state, e.g., at the highest available fidelity, absent subsequent changes in dependency data on which the portion of transaction data 126 may depend. The process of FIG. 8 may iterate any number of times to cause the generation of transaction data 126 at any number of fidelity levels.

Figure 9:
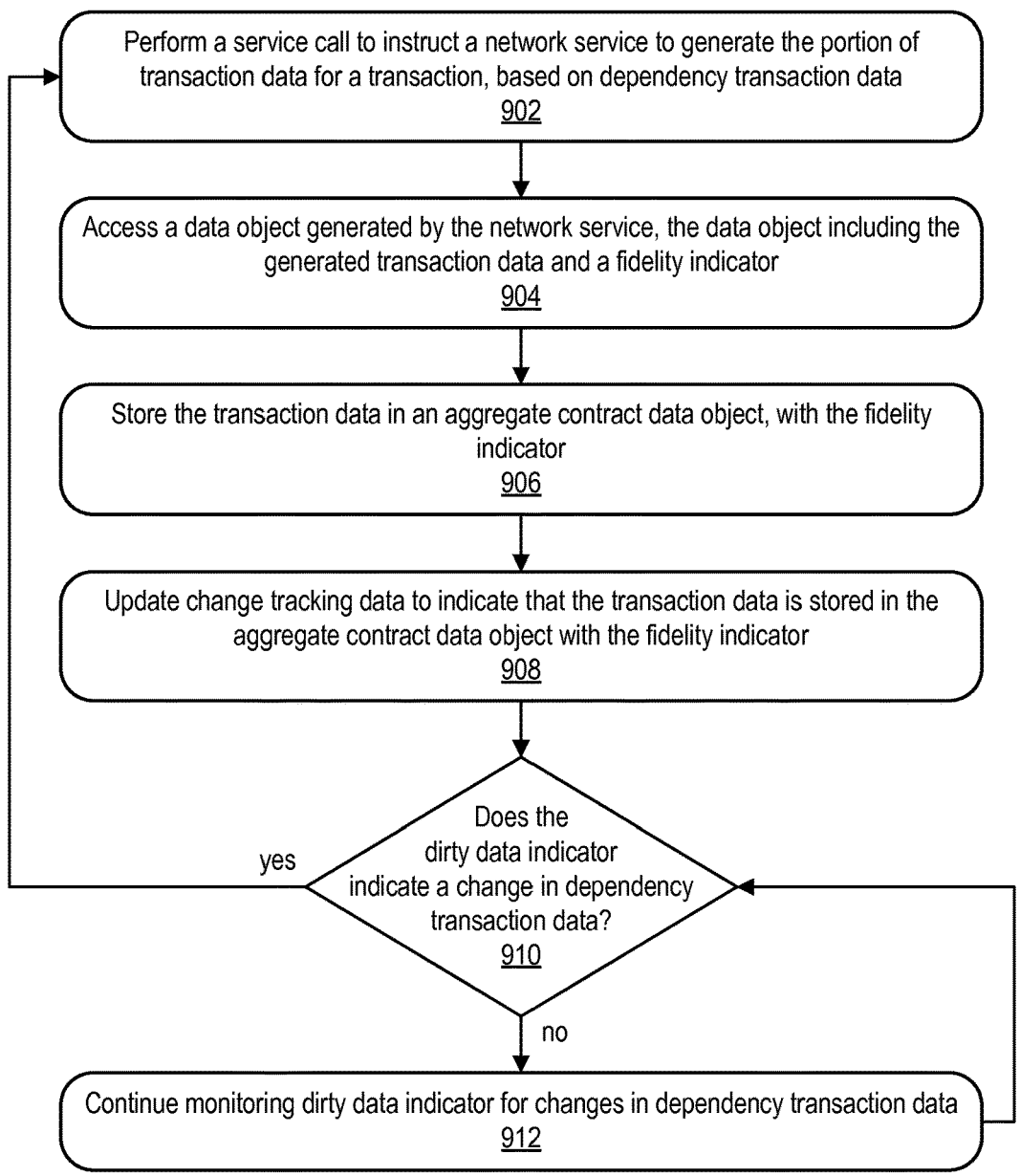
FIG. 9 is a flow diagram illustrating one or more embodiments of a process for performing subsequent service call(s) to instruct a network service to generate updated transaction data, based on a determination that dependency data has changed since a previous generation of transaction data.

FIG. 9 is a flow diagram illustrating one or more embodiments of a process for performing subsequent service call(s) 118 to instruct a network service 120 to generate updated transaction data 126, based on a determination that dependency data has changed since a previous generation of the transaction data 126. Operations of the process may be performed by one or more of the e-commerce application 108, the client process 106, the contract engine 112, the network service(s) 120, the workflow management service 138, or other module(s) executing on the contract processing device(s) 114, the end-user device(s) 102, the front end server device(s) 104, or other computing device(s).

At 902, a service call 118 may be performed by the contract engine 112 to instruct a network service 120 to generate a portion of transaction data 126, as described above. In some cases, the service call 118 may include input data 122 that is dependency transaction data 126 on which the requested transaction data 126 depends.

At 904, a data object 124 may be received or otherwise accessed, the data object 124 including the portion of transaction data 126 generated by the network service 120 in response to the service call 118. The data object 124 may also include a fidelity indicator 134 for the transaction data 126.

At 906, the transaction data 126 may be stored in the aggregate contract data object 116. In some cases, the fidelity indicator 134 may also be included in the aggregate contract data object 116.

At 908, in some embodiments the change tracking data 128 may be updated to indicate that the transaction data 126 has been stored in the aggregate contract data object 116. As described above, in some embodiments the change tracking data 128 may include the fidelity indicator 134 indicating the fidelity of the stored transaction data 126.

At 910, a determination may be made whether any portion of dependency data on which the transaction data 126 depends has changed since the transaction data 126 was last generated by the network service 120. Such a determination may be made based on the value of a dirty data indicator 136, as described above. If dependency data has changed, the process may return to 902 and send another service call 118 to request that updated transaction data 126 be generated based on the changed dependency data. In some cases, the determination that updated transaction data 126 is to be generated may be made by the workflow management service 138, which may instruct the contract engine 112 to send the subsequent service call 118. In some embodiments, the change tracking data 128 or the aggregate contract data object 116 may be periodically examined (e.g., at a predetermined frequency) by the workflow management service 138 or another module, to determine whether any portion of stored transaction data 126 is out of date and may be updated.

If it is determined that the portion of transaction data 126 is current, such that dependency data has not changed since the transaction data 126 was last generated, the workflow management service 138, or some other module, may continue monitoring (e.g., periodically checking) the dirty data indicator 136 to determine whether there have been changes in the dependency data that may necessitate an update of the transaction data 126. The process of FIG. 9 may iterate any number of times to update the transaction data 126, responsive to changes in the dependency data.

In some embodiments, a network service 120 may store a previously calculated version of transaction data 126, e.g., previously calculated based on a previous value of dependency data or previously calculated at a particular fidelity. The network service 120 may also store previously received input data 122 and compare the previous input data 122 to input data 122 that is received in a subsequent service call 118. If the input data 122 has not changed between the two service calls 118, the network service 120 may return the previously calculated transaction data 126. If the input data 122 has changed, but not in a way that may alter the calculation of the transaction data 126, the network service 120 may return the previously calculated transaction data 126. If a subsequent service call 118 is requesting the calculation of transaction data 126 at a different fidelity than previously calculated, the network service 120 may determine whether the fidelity difference would alter the calculated value(s) of the transaction 126. If not, the network service 120 may return the previously calculated transaction data 126. In some embodiments, the service call 118 may include both the previous version of the input data 122 and the current version of the input data 122. The network service 120 may then compare the two versions and determine whether there is any change in the input data 122 that may necessitate a recalculation of the transaction data 126. The network service 120 may also store information regarding the dependency data over multiple calculations of a portion of transaction data 126. For example, a network service 120 may store information describing whether a previously calculated portion of transaction data 126 was low fidelity because a low fidelity answer was requested, or because low fidelity dependency data was employed to calculate the answer. Such information may then be employed by the network service 120 to determine whether the portion of the transaction data 126 may need to be recalculated in response to a subsequent service call 118. In some cases, the fidelity of the calculated transaction data 126 may depend, at least in part, on the fidelity of the dependency data on which the calculated transaction data 126 depends.

As described above, the network service 120 may cache or otherwise store a previously calculated version of transaction data 126 with a TTL indication that indicates how long the transaction data 126 is valid. If a service call 118 requesting the transaction data 126 is received at the network service 120, at a time that is within the TTL, the previously calculated version of the transaction data 126 may be returned to the contract engine 112 in response to the service call 118. If the service call 118 is received outside the TTL, the transaction data 126 may be recalculated and provided to the contract engine 112. A TTL may be employed to determine whether to recalculate or otherwise regenerate the transaction data 126, for example, in cases where the dependency data used to calculate the transaction data 126 is time sensitive in some way. For example, a total price calculation may be based on a promotion that is valid for a period of time.

In some embodiments, the transaction data 126 may be stored in the aggregate contract data object 116 with a TTL indicator that indicates how long the stored portion of transaction data 126 is valid before it may need to be recalculated by a network service 120. If a portion of transaction data 126 is stored in the aggregate contract data object 116 with a TTL that indicates the stored portion of transaction data 126 is no longer valid, a subsequent service call 118 may be performed to request that a network service 120 recalculate or otherwise regenerate the portion of transaction data 126 for which the TTL has expired. The use of the TTL indicator may enable the contract engine 112 to avoid unnecessary service call(s) 118, and thus reduce the overall latency of the transaction processing. The TTL indicator may be separate from the dirty data indicator 136.

In some embodiments, a lower fidelity portion of transaction data 126 may be generated, stored in the aggregate contract data object 116, and provided to the client process(es) 106 for presentation to an end-user. Other business processes (e.g., processes that are not end-user facing) may, however, employ a higher fidelity version of the transaction data 126 in their own processing. For example, a lower fidelity estimate of delivery date (e.g., within a three day range) may be calculated and provided to the end-user, and a higher fidelity estimate (e.g., within a particular day or hour) may be calculated and employed by various business processes that are involved in the fulfillment of the order. Such fulfillment process(es) may employ the higher fidelity estimate to determine from which fulfillment center the item(s) are to be shipped, which delivery method to employ, and so forth. In some cases, a business process that is separate from the client process 106 may instruct the contract engine 112 that a higher fidelity version of the transaction data 126 is required by the business process. The contract engine 112 may then perform service call(s) 118 to cause the transaction data 126 to be generated at the higher fidelity. The higher fidelity transaction data 126 may then be provided to the business process. In some embodiments, the business process may instruct the workflow management service 138 to instruct the contract engine 112 to perform the service call(s) 118 to cause the generation of higher fidelity transaction data 126. Embodiments support the generation of any number of versions of transaction data 126 at various fidelity levels, the various versions to be provided to different business processes or client process(es) 106 according to their own processing requirements. In some embodiments, a business process (e.g., for fulfillment) may operate as a network service 120 with respect to the contract engine 112. A network service 120 may indicate, during its registration for example, that it is to receive particular input data 122 (e.g., a delivery estimate) with a particular fidelity or a minimum fidelity.

In some embodiments, the particular portion(s) of transaction data 126 to be initially generated may be based on the particular information that the client process(es) 106 are to present to the end-user via the e-commerce application 108, or may be based on the particular information requested by the end-user. In such cases, those particular portion(s) of transaction data 126 may be generated initially, and other portion(s) of transaction data 126 may be generated later after the initial portion(s) have been generated and provided for presentation. In some embodiments, the workflow management service 138 may ensure that the other portion(s) of transaction data 126 are eventually generated and provided to the client process 106 or business process(es).

Figure 10:
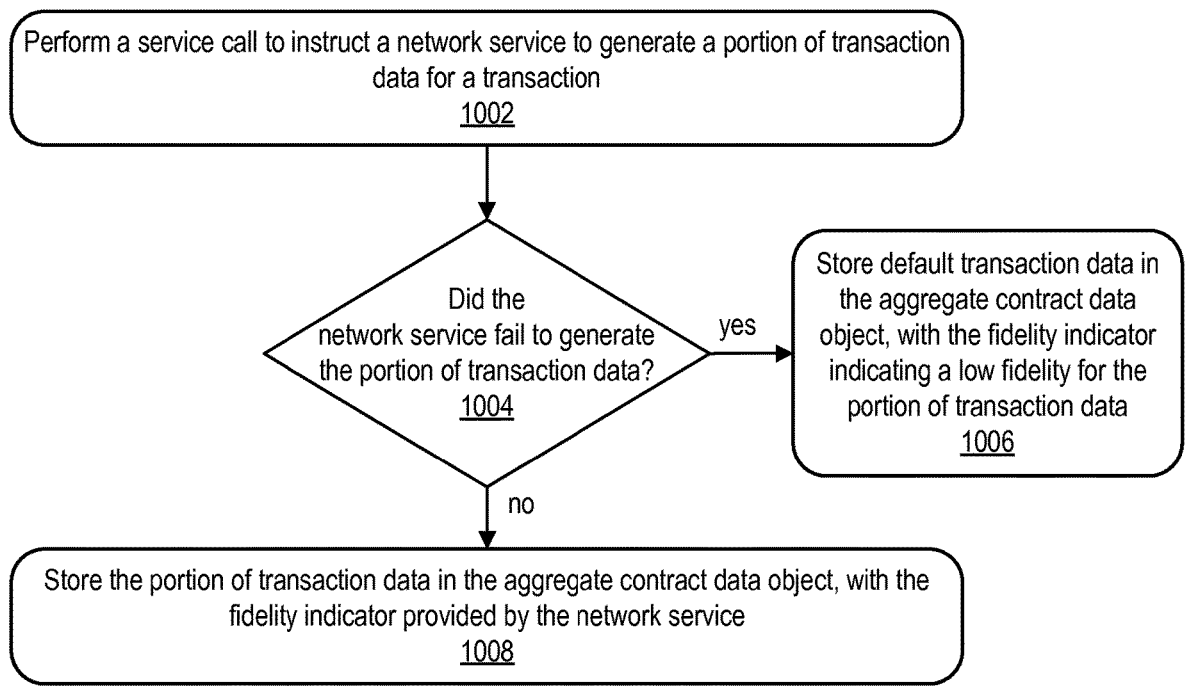
FIG. 10 is a flow diagram illustrating one or more embodiments of a process for employing default transaction data in place of actual transaction data, in cases where a network service fails to generate actual transaction data.

FIG. 10 is a flow diagram illustrating one or more embodiments of a process for employing default transaction data 302 in place of actual transaction data 126, in cases where a network service 120 fails to generate the actual transaction data 126. Operations of the process may be performed by one or more of the e-commerce application 108, the client process 106, the contract engine 112, the network service(s) 120, the workflow management service 138, or other module(s) executing on the contract processing device(s) 114, the end-user device(s) 102, the front end server device(s) 104, or other computing device(s).

At 1002, the contract engine 112 may perform a service call 118 to instruct a network service 120 to generate a portion of transaction data 126 for a transaction, as described above.

At 1004, a determination may be made whether the network service 120 failed to generate the requested portion of transaction data 126. If the network service 120 failed, the process may proceed to 1006.

At 1006, default transaction data 302 may be stored in the aggregate contract data object 116 as described above with reference to FIG. 3. In some embodiments, the fidelity indicator 134 may be updated in one or both of the aggregate contract data object 116 or the change tracking data 128, to indicate that the currently stored default transaction data 302 is of low fidelity (e.g., the lowest possible fidelity).

If it is determined at 1004 that the network service 120 did not fail, and a data object 124 was received that includes the generated transaction data 126, the process may proceed to 1008. At 1008, the received portion of transaction data 126 may be stored in the aggregate contract data object 116 as described above.

Figure 11:
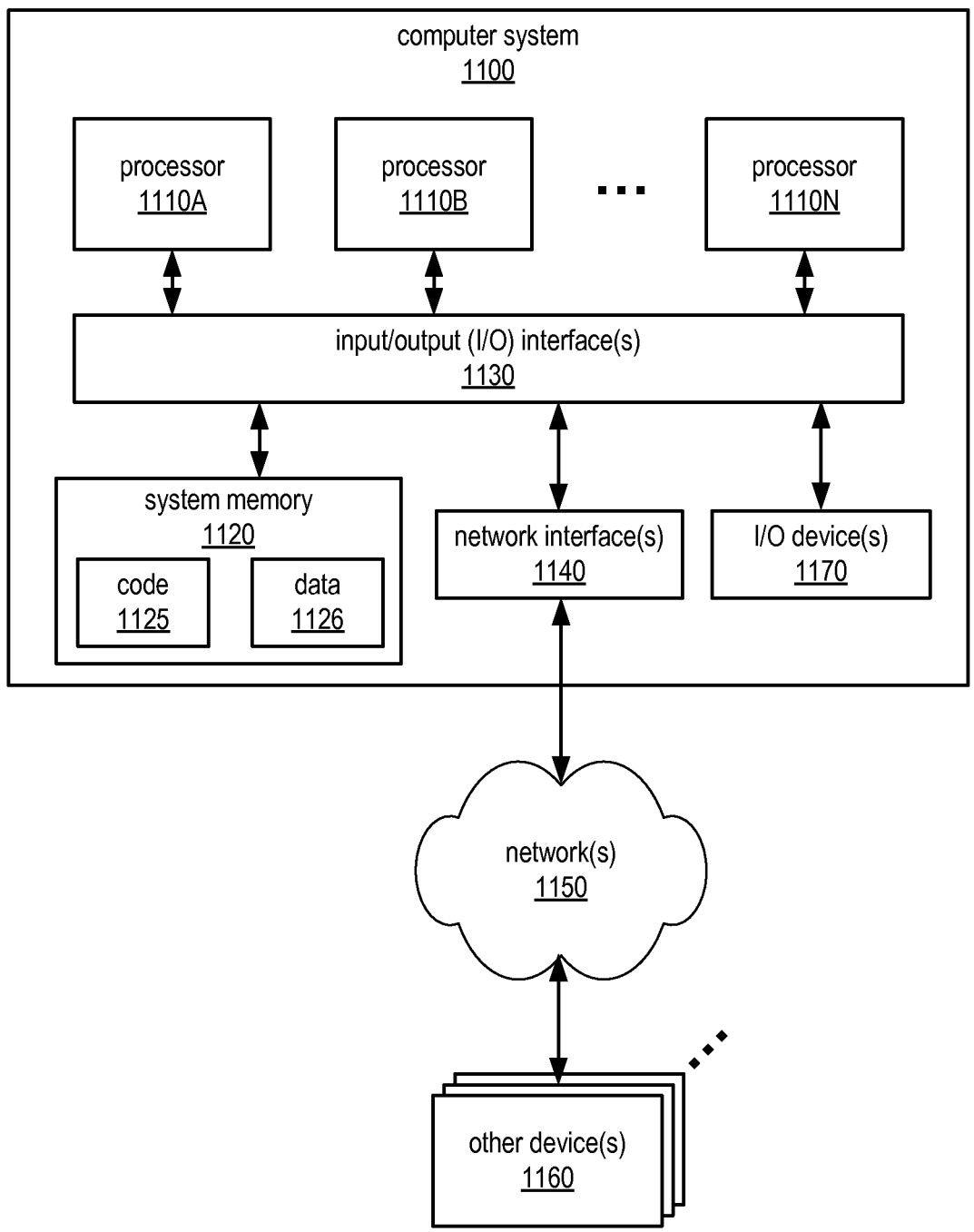
FIG. 11 is a block diagram illustrating a computer system configured to implement one or more embodiments.

FIG. 11 is a block diagram illustrating a computer system 1100 configured to implement at least a portion of the queue-based communication described herein according to various embodiments. The computer system 1100 may include any number of computing devices, and may execute or otherwise include any number of software modules such as applications, processes, libraries, interfaces, application programming interfaces (APIs), and so forth. For example, computer system 1100 may be configured to implement one or more of the contract processing device(s) 114, the end-user device(s) 102, the front end server device(s) 104, and so forth. The computer system 1100 may include any type of computing device including but not limited to: a personal computer system, a desktop computer, a rack-mounted computing device, a laptop or notebook computer, a tablet computer, an electronic book (e-book) reader, a wearable computer, an implanted computer, a mainframe computer system, a distributed computing device (e.g., cloud server), a handheld computer, a workstation, a network computer, a consumer device, an automotive computer, a home entertainment device, a smart appliance, a storage device, a telephone, a remote control, a game controller, a gaming system, a mobile telephone, a smartphone, or any other type of computing device.

The computing system 1100 may include one or more physical computing devices. The computing system 1100 may also include one or more of a virtual computing environment, a hypervisor, an emulation, or a virtual machine executing on one or more physical computing devices. In some embodiments, the computing system 1100 may comprise a cluster, cloud, farm, or other grouping of multiple devices that coordinate operations to provide load balancing, failover support, parallel processing capabilities, shared storage resources, or other aspects.

Computer system 1100 may include one or more processors 1110 coupled to a system memory 1120 via one or more input/output (I/O) interfaces 1130. One or more of the processor(s) 1110 may include a single core or multiple cores, which may be configured to execute single-threaded or multi-threaded code. In various embodiments, computer system 1100 may be a uniprocessor system including one processor 1110, or a multiprocessor system including multiple processors 1110 (e.g., two, four, eight, or any other number). The processor(s) 1110 may include any processor(s) capable of executing instructions. For example, in various embodiments, the processor(s) 1110 may include general-purpose or embedded processor(s) implementing any of a variety of instruction set architectures (ISAs), such as the x86, PowerPC, SPARC, or MIPS ISAs, or any other ISA. In multiprocessor systems, each of processors 1110 may implement the same ISA. Alternatively, different ones of the processors 1110 may implement different ISAs.

The computer system 1100 may include one or more system memories 1120, described herein as system memory 1120, configured to store one or more of code 1125 or data 1126 such that the code 1125 and the data 1126 are accessible by the processor(s) 1110. The system memory 1120 may comprise one or more computer-readable storage media that include one or more of the following: an electronic storage medium, a magnetic storage medium, an optical storage medium, a quantum storage medium, a mechanical computer storage medium, a solid state storage medium, and so forth. The system memory 1120 may be implemented using any memory technology, including but not limited to one or more of the following: read-only memory (ROM), random access memory (RAM), static RAM (SRAM), dynamic RAM (DRAM), Rambus DRAM (RDRAM), extended data out (EDO) RAM, synchronous DRAM (SDRAM), double data rate SDRAM (DDR SDRAM), electrically erasable programmable ROM (EEPROM), flash memory, non-volatile memory, volatile memory, or any other type of memory. The system memory 1120 may be incorporated into the computer system 1100. In some cases, at least a portion of the system memory 1120 may be external to the computer system 1100 and accessible via the network interface(s) 1140 or the I/O device(s) 1170.

The system memory 1120 may include the code 1125. The code 1125 may include executable instructions that are executable by processor(s) 1110 to implement the embodiments described herein. The code 1125 may implement one or more executable software modules, such as applications, programs, processes, libraries, interfaces, APIs, scripts, routines, and so forth. The code 1125 may be in a compressed or uncompressed form. The code 1125 may be in an encrypted or unencrypted form. The code 1125 may include any number of instructions that may be employed to program a computing device, or other electronic device, to perform the operations described herein. The code 1125 may be arranged in any format and according to any language. In some embodiments, the code 1125 may include machine-executable binary instructions that are configured to execute on the processor(s) 1110, the instructions generated by compiling, linking, or otherwise processing source code written in any programming language. In some embodiments, the code 1125 may include intermediate language instructions (e.g., bytecodes) that execute within a runtime application such as a Java™ Virtual Machine (JVM), C #™ runtime, or any other runtime, interpreter, virtual machine, or execution engine running on the computer system 1100. In some embodiments, the code 1125 may include instructions written in a scripting language or interpreted language, such as JavaScript™, ActiveScript™, VBScript™, Perl™, and so forth. In such cases, the code 1125 may execute within a runtime, interpreter, virtual machine, scripting engine, or other process that executes on the computer system 1100.

The code 1125 may include instructions to implement one or more of the e-commerce application 108, the client process 106, the contract engine 112, the network service(s) 120, or the workflow management service 138. The code 1125 may also include instructions to implement at least one operating system (OS) that executes on the computer system 1100. The at least one OS may include one or more of the following: any version of the UNIX™ OS; any version of the Linux™ OS; any version of iOS™ or OSX™ from Apple Corp. of Cupertino, California, USA; any version of Windows™ or Windows Mobile™ from Microsoft Corp. of Redmond, Washington, USA; any version of Android™ from Google Corp. of Mountain View, California, USA and its derivatives from various sources; any version of Palm OS™ from Palm Computing, Inc. of Sunnyvale, California, USA and its derivatives from various sources; any version of BlackBerry OS™ from Research In Motion Ltd. of Waterloo, Ontario, Canada; any version of VxWorks™ from Wind River Systems of Alameda, California, USA; or other operating systems.

The system memory 1120 may include data 1126 employed during operations of the computer system 1100. The data 1126 may include one or more of the following: the transaction request 110, the request(s) 130, the transaction data 126, the data object(s) 124, the service call(s) 118, the aggregate contract data object 116, the change tracking data 128, the fidelity indicator 134, or the dirty data indicator 136. The data 1126 may be stored in any format. In some embodiments, at least a portion of the data 1126 may be stored externally to the computer system 1100, on one or more other devices or storage media that may communicate with the computer system 1100 via the network interface(s) 1140, the I/O interface(s) 1130, or the I/O device(s) 1170. The system memory 1120 may include persistent storage such as one or more hard drives, tape drives, solid state memory, other mass storage devices, or any other persistent storage device. The system memory 1120 may also include active memory, physical memory, or virtual memory that is employed by processes executing on the computer system 1100. The system memory 1120 may include cache memory.

The system memory 1120 may comprise one or more non-transitory storage media that store information such as one or both of the code 1125 or the data 1126. Non-transitory storage media may store information in any arrangement, and using any storage technology, such that the stored information is computer-readable, i.e., readable by a machine such as a computing device. Non-transitory storage media may include any media that is configured to store information such that the stored information persists for at least a minimum duration relative to the operations described herein. Non-transitory storage media may include any media that is transportable as a physical object. Embodiments may include software comprising one or both of the code 1125 or the data 1126 stored on the system memory 1120 that comprises one or more non-transitory storage media. Such software may be used to program the computer system 1100, or other electronic devices, to perform one or more operations according to various embodiments.

Embodiments may also include software that is transmitted in a transitory form as an electromagnetic transmission, optical transmission, acoustical transmission, or any other type of signal or communication. Such software may be communicated using any communication protocol over the Internet or any other communications network, using a wired or wireless communication path. In such cases, the software may be received using the network interface(s) 1140 and employed to program the computer system 1100, or other electronic devices, to perform one or more operations according to various embodiments.

The I/O interface(s) 1130 may be configured to coordinate I/O traffic between the processor(s) 1110, the system memory 1120, and any peripheral devices accessible to the computer system 1100 through the network interface(s) 1140 or other peripheral interface(s). In some embodiments, the I/O interface(s) 1130 may perform protocol, timing or other data transformations to convert data from one component (e.g., the system memory 1120) into a format suitable for use by another component (e.g., the processor(s) 1110). In some embodiments, the I/O interface(s) 1130 may include support for devices attached through various types of peripheral buses that support any bus standard such as any variant of the Peripheral Component Interconnect (PCI) bus standard or the Universal Serial Bus (USB) standard. In some embodiments, the function of I/O interface(s) 1130 may be split into two or more separate components, such as a north bridge and a south bridge. Moreover, in some embodiments at least some of the functionality of I/O interface(s) 1130, such as an interface to the system memory 1120, may be incorporated directly into the processor(s) 1110.

The computer system 1100 may include one or more network interfaces 1140 coupled to the I/O interface(s) 1130. The one or more network interfaces 1140 may be employed by the various components or software of the computer system 1100 to communicate with other systems and/or components over one or more communications networks 1150. The network interface(s) 1140 may include one or more network interface controllers (NICs), transceiver devices, or other types of network communications devices configured to send and receive communications over the network(s) 1150.

The computer system 1100 may employ the network interface(s) 1140 to communicate and exchange data with one or more other devices 1160 over the network(s) 1150. The network interface(s) 1140 may support one or more wireless networking protocols such as any version of the Institute of Electrical and Electronics Engineers (IEEE) 802.11 standard or other wireless networking standard. The network interface(s) 1140 may also support communication via any wired data networks, such as Ethernet networks. The network interface(s) 1140 may also support communication via any telecommunications or telephony network such as analog voice networks or digital fiber communications networks, via storage area networks such as Fibre Channel storage area networks (SANs), or via any other suitable type of network and/or protocol.

In some embodiments, the network interface(s) 1140 may be configured to enable communication between the computer system 1100 and one or more I/O devices 1170, or between the computer system 1100 and external (e.g., remote) storage device(s). The I/O device(s) 1170 may include one or more data input devices such as a keyboard, a keypad, a mouse, a pen, a game controller, a touch input device, an audio input device (e.g., a microphone), a gestural input device, a haptic input device, an image or video capture device (e.g., a camera), or other data input devices. In some cases, the I/O device(s) 1170 may include one or more data output devices such as a display, an audio output device (e.g., a speaker), a printer, a haptic output device, and so forth.

The I/O device(s) 1170 may be components of all the devices included in the computer system 1100 or may be components of different devices that comprise the computer system 1100. The I/O device(s) 1170 may be physically incorporated with the computer system 1100. In some embodiments, one or more of the I/O device(s) 1170 may be externally placed relative to the computer system 1100 and may communicate with the computer system 1100 using a wired or wireless connection, such as over the network interface(s) 1140. In various embodiments, the computer system 1100 may include more, fewer, or different components than those illustrated in FIG. 11.

The network(s) 1150 may include public networks such as the Internet, private networks such as an institutional or personal intranet, or some combination of private and public networks. The network(s) 1150 may include any type of wired or wireless network, including but not limited to local area networks (LANs), wide area networks (WANs), wireless WANs (WWANs), wireless LANs (WLANs), mobile communications networks (e.g., 3G, 4G, etc.), and so forth. The various computing systems, devices, and processes described herein may employ the network(s) 1150 for communication. Such communications may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol. The network(s) 1150 may be employed for communications between any of the processes or devices depicted in FIGS. 1-10.

The various elements depicted in the figures may be configured similarly to like-numbered elements, or may perform similar operations to those performed by like-numbered elements. The various methods, processes, and routines illustrated in the figures and described herein represent example embodiments. The methods may be implemented as software, as hardware, as manual operations, or as any combination thereof. The order of operations performed by any method, process, or routine described herein may be changed, and one or more operations may be added, reordered, combined, omitted, or modified. The operations may be performed serially or in parallel. In cases where the methods, process, and routines described herein are implemented as computer programs, any number of instances of these programs may be executed on any number of separate computer systems or on the same computer system. Although certain operations may be described herein as performed by particular devices, software programs, processes, or entities, embodiments are not limited to these examples. A variety of alternative embodiments will be understood by those having ordinary skill in the art.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method, comprising:
 performing, by one or more computers:
  accessing, by a backend service, a transaction request from a client process, the transaction request describing a transaction;
  performing, by the backend service responsive to the transaction request, a plurality of respective service calls over a network to instruct different respective ones of a plurality of distinct network services to generate transaction data to be combined into an aggregate data object for responding to the transaction request, wherein different service calls of the plurality of respective service calls over the network to the respective network services of the plurality of network services include one or more respective constraints on a time to provide the transaction data or on fidelity for which the respective network service is to provide the transaction data, and wherein the fidelity indicates an accuracy of the transaction data, or a degree of variance of a calculated portion of the transaction data relative to a highest fidelity version of the calculated portion of the transaction data, or a quality of the transaction data, and wherein the constraints are different for different transaction requests;
  generating transaction data at a determined fidelity, by a given network service of the respective network services in response to one of the respective service calls, wherein said generating comprises:
   accessing historical data of previously measured generation times for other instances of the requested transaction data or similar transaction data that were generated; and
   determining the fidelity based on the one or more respective constraints included in the service call to the respective network service and based on the historical data;
  accessing, by the backend service, data objects generated by the respective network services in response to the respective service calls, the individual ones of the data objects including:
   the respective transaction data that is generated, by the respective network service, at a highest fidelity that the respective service determined possible according to the one or more respective constraints included in the respective service call to the respective network service, wherein the fidelity of the generated transaction data is different for service calls corresponding to different transaction requests in accordance with the different one or more constraints for the respective transaction request; and
a respective fidelity indicator indicating the fidelity of the respective transaction data generated by the respective network service;
combining, by the backend service, the respective transaction data from the respective data objects generated by the respective network services in the aggregate data object; and
providing the aggregate data object to the client process.

2. The method of claim 1, wherein:
the respective transaction data generated by one of the respective network services is stored with a time to live (TTL) indicator that indicates a time period during which the respective transaction data is valid; and
the method further comprises performing a subsequent service call to instruct the respective network service to regenerate the respective transaction data based on the TTL indicator indicating that the stored transaction data is invalid.

3. The method of claim 1, wherein:
the transaction request includes a user identifier of a user associated with the transaction; and
for a given one of the respective network services, the fidelity of the respective transaction data is based at least partly on a characteristic of the user.

4. The method of claim 1, wherein:
a portion of the transaction data depends on dependency transaction data;
the portion of the transaction data is associated with a dirty data indicator indicating whether the dependency transaction data has changed since the portion of the transaction data was generated; and
the method further comprises:
based on the dirty data indicator, determining that the dependency transaction data has changed since the portion of the transaction data was generated;
performing a subsequent service call to instruct the respective network service to regenerate the portion of the transaction data based on the dependency transaction data that has changed;
accessing a subsequent data object generated by the respective network service in response to the subsequent service call, the subsequent data object including the regenerated transaction data; and
providing the regenerated transaction data to the client process.

5. The method of claim 1, further comprising:
performing a subsequent service call to instruct a given one of the network services to generate the respective transaction data at a higher fidelity than the fidelity of the respective transaction data included in the respective data object;
accessing a subsequently generated data object that includes higher fidelity transaction data generated by the given network service; and
providing the higher fidelity transaction data to the client process.

6. The method of claim 1, wherein the transaction data comprises one or more of:
an estimated delivery date for one or more items associated with the transaction;
an availability of the one or more items;
a seller of the one or more items;
a tax amount for the one or more items;
a price for the one or more items; or
gift information for the one or more items.

7. The method of claim 1, further comprising:
determining that a given one of the network services failed to respond to a respective one of the service calls;
responsive to said determining that the network service failed to respond to the service call, accessing default transaction data associated with the given network service, the default transaction data previously determined during a registration of the network service; and
providing the default transaction data to the client process with the respective fidelity indicator indicating a low fidelity of the default transaction data.

8. One or more non-transitory computer-readable media storing instructions which, when executed by one or more processors, instruct the one or more processors to perform actions comprising:
accessing, by a backend service, a transaction request from a client process, the transaction request describing a transaction;
performing, by the backend service responsive to the transaction request, a plurality of respective service calls over a network to instruct different respective ones of a plurality of distinct network services to generate transaction data to be combined into an aggregate data object for responding to the transaction request, wherein different service calls of the plurality of respective service calls over the network to the respective network services of the plurality of network services include one or more respective constraints on a time to provide the respective transaction data or on fidelity for which the respective network service is to provide the transaction data, and wherein the fidelity indicates an accuracy of the transaction data, or a degree of variance of a calculated portion of the transaction data relative to a highest fidelity version of the calculated portion of the transaction data, or a quality of the transaction data, and wherein the constraints are different for different transaction requests;
generating transaction data at a determined fidelity, by a given network service of the respective network services in response to one of the respective service calls, wherein said generating comprises:
accessing historical data of previously measured generation times for other instances of the requested transaction data or similar transaction data that were generated; and
determining the fidelity based on the one or more respective constraints included in the service call to the respective network service and based on the historical data;
accessing, by the backend service, data objects generated by the respective network services in response to the respective service calls, the individual ones of the data objects including:
the respective transaction data that is generated, by the respective network service, at a highest fidelity that the respective service determined possible according to the one or more respective constraints included in the respective service call to the respective network service, wherein the fidelity of the generated transaction data is different for service calls corresponding to different transaction requests in accordance with the different one or more constraints for the respective transaction request; and
 a respective fidelity indicator indicating the fidelity of the respective transaction data generated by the respective network service;
combining, by the backend service, the respective transaction data from the respective data objects generated by the respective network services in the aggregate data object; and
providing the aggregate data object to the client process.

9. The one or more non-transitory computer-readable media of claim 8, wherein the actions further comprise:
performing a subsequent service call to instruct an individual one of the network services to generate the respective transaction data at a higher fidelity than the fidelity of the respective transaction data included in the respective data object;
accessing a subsequently generated data object that includes higher fidelity transaction data generated by the respective network service; and
providing the higher fidelity transaction data to the client process.

10. The one or more non-transitory computer-readable media of claim 8, wherein:
a portion of the transaction data depends on dependency transaction data;
the portion of the transaction data is associated with a dirty data indicator indicating whether the dependency transaction data has changed since the portion of the transaction data was generated; and
the actions further comprise:
 based on the dirty data indicator, determining that the dependency transaction data has changed since the portion of the transaction data was generated;
 performing a subsequent service call to instruct the respective network service to regenerate the portion of the transaction data based on the dependency transaction data that has changed;
 accessing a subsequent data object generated by the respective network service in response to the subsequent service call, the subsequent data object including the regenerated transaction data; and
 providing the regenerated transaction data to the client process.

11. The one or more non-transitory computer-readable media of claim 8, wherein:
the one or more constraints included in the call to a given one of the network services includes a time limit for providing the respective transaction data; and
the one or more constraints included in the call to the given one of the network services indicate that the given network service is to generate the respective transaction data at a highest fidelity that the given network service is capable of generating within the time limit.

12. The one or more non-transitory computer-readable media of claim 8, wherein:
the one or more constraints included in the call to a given one of the network services indicate that the given network service is to generate the respective transaction data at a highest fidelity that the given network service is capable of generating without a time limit.

13. The one or more non-transitory computer-readable media of claim 8, wherein:
the transaction request includes one or more of:
 a time limit for providing the transaction data; or
 a requested fidelity of the transaction data; and
one or more of the time limit or the requested fidelity are included in the one or more constraints on the generation of at least a portion of the transaction data by one or more of the network services.

14. The one or more non-transitory computer-readable media of claim 8, the actions further comprising:
determining that a given one of the network services failed to respond to the respective service call;
responsive to determining that the given network service failed to respond to the respective service call, accessing default transaction data associated with the given network service, the default transaction data previously determined during a registration of the given network service;
providing the default transaction data to the client process with the fidelity indicator indicating a low fidelity of the default transaction data; and
performing a subsequent service call to instruct the given network service to generate the transaction data.

15. A system, comprising:
one or more computing devices configured to provide one or more services including a backend service;
wherein the backend service is configured to:
 access a transaction request from a client process, the transaction request describing a transaction;
 perform, responsive to the transaction request, a plurality of respective service calls over a network to instruct different respective ones of a plurality of distinct network services to generate transaction data to be combined into an aggregate data object for responding to the transaction request, wherein different service calls of the plurality of the respective service calls over the network to the respective network services of the plurality of network services including one or more respective constraints on a time to provide the respective transaction data or on fidelity for which the respective network service is to provide the transaction data, wherein the fidelity indicates an accuracy of the transaction data, or a degree of variance of a calculated portion of the transaction data relative to a highest fidelity version of the calculated portion of the transaction data, or a quality of the transaction data, and wherein the constraints are different for different transaction requests;
 generate transaction data at a determined fidelity, by a given network service of the respective network services in response to one of the respective service calls, wherein said generating comprises:
  access historical data of previously measured generation times for other instances of the requested transaction data or similar transaction data that were generated; and
  determine the fidelity based on the one or more respective constraints included in the service call to the respective network service and based on the historical data;
 access data objects generated by the respective network services in response to the respective service calls, the individual ones of the data objects including:
  the respective transaction data that is generated, by the respective network service, at a highest fidelity that the respective service determined possible according to the one or more respective constraints included in the respective service call to the respective network service, wherein the fidelity of the generated transaction data is different for service calls corresponding to different transaction requests in accordance with the different one or more constraints for the respective transaction request; and a respective fidelity indicator indicating the fidelity of the respective transaction data generated by the respective network service;

combine the respective transaction data from the respective data objects generated by the respective network services in the aggregate data object; and provide the aggregate data object to the client process.

16. The system of claim 15, wherein:
the respective transaction data generated by one of the respective network services is stored with a time to live (TTL) indicator that indicates a time period during which the respective transaction data is valid; and
the backend service is further configured to perform a subsequent service call to instruct the network service to regenerate the transaction data based on the TTL indicator indicating that the stored transaction data is invalid.

17. The system of claim 15, wherein:
a portion of the transaction data depends on dependency transaction data;
the portion of the transaction data is associated with a dirty data indicator indicating whether the dependency transaction data has changed since the portion of the transaction data was generated; and
the backend service is further configured to, based on the dirty data indicator, perform a subsequent service call to instruct the respective network service to regenerate the portion of the transaction data based on the dependency transaction data that has changed.

18. The system of claim 15, wherein the backend service is further configured to:

perform a subsequent service call to instruct a given one of the network services to generate the respective transaction data at a higher fidelity than the fidelity of the respective transaction data included in the respective data object;

access a subsequently communicated data object that includes higher fidelity transaction data generated by the given network service; and provide the higher fidelity transaction data to the client process.

19. The system of claim 15, wherein the transaction data comprises one or more of:
an estimated delivery date for one or more items associated with the transaction;
an availability of the one or more items;
a seller of the one or more items;
a tax amount for the one or more items;
a price for the one or more items; or
gift information for the one or more items.

20. The system of claim 15, wherein the backend service is further configured to:
determine that a given one of the network services failed to respond to the respective service call;
responsive to a determination that the given network service failed to respond to the respective service call, access default transaction data associated with the given network service, the default transaction data previously determined during a registration of the given network service;
provide the default transaction data to the client process with the fidelity indicator indicating a low fidelity of the default transaction data; and
perform a subsequent service call to instruct the given network service to generate the respective transaction data.

* * * * *